United States Patent [19]

Rider

[11] Patent Number: 5,174,033
[45] Date of Patent: Dec. 29, 1992

[54] ANGLE SENSOR FOR A STEERABLE BORING TOOL

[75] Inventor: Alan J. Rider, Reston, Va.

[73] Assignee: The Charles Machine Works, Inc., Perry, Okla.

[21] Appl. No.: 837,110

[22] Filed: Feb. 18, 1992

Related U.S. Application Data

[63] Continuation of Ser. No. 539,699, Jun. 18, 1990, abandoned.

[51] Int. Cl.⁵ ............................................... G01C 9/06
[52] U.S. Cl. ...................................... 333/366; 33/304; 33/313; 364/559
[58] Field of Search ............... 33/304, 312, 313, 366; 364/559

[56]  References Cited

U.S. PATENT DOCUMENTS

| | | | |
|---|---|---|---|
| 2,936,411 | 5/1960 | Doty | 33/366 |
| 3,172,212 | 3/1965 | Pappas | 33/366 |
| 3,434,219 | 3/1969 | Bowman | 33/312 |
| 3,906,471 | 9/1975 | Shawhan | 33/366 |
| 4,028,815 | 6/1977 | Buckley et al. | 33/366 |
| 4,167,818 | 9/1977 | Cantarella et al. | 33/366 |
| 4,244,117 | 1/1981 | Cantarella et al. | 33/366 |
| 4,422,243 | 12/1983 | Brunson et al. | 33/366 |
| 4,521,973 | 6/1985 | Wicklund et al. | 33/366 |
| 4,641,434 | 2/1987 | Engler | 33/366 |
| 4,644,662 | 2/1987 | Anderson et al. | 33/366 |
| 4,682,129 | 7/1987 | Bakermans et al. | 361/312 |
| 4,779,353 | 10/1988 | Lopes et al. | 33/366 |
| 4,811,491 | 3/1989 | Phillips et al. | 33/366 |
| 4,937,518 | 6/1990 | Donati et al. | 33/312 |
| 5,014,795 | 5/1991 | Gibson | 33/366 |

FOREIGN PATENT DOCUMENTS

| | | | |
|---|---|---|---|
| 0009309 | 7/1987 | Japan . | |
| 0063913 | 3/1988 | Japan | 33/1 N |
| 8704515 | 7/1987 | PCT Int'l Appl. . | |
| 2204136 | 11/1988 | United Kingdom | 33/366 |
| 9011489 | 10/1990 | World Int. Prop. O. | 33/366 |

Primary Examiner—Allan N. Shoap
Assistant Examiner—Alvin Wirthlin
Attorney, Agent, or Firm—Banner, Birch, McKie & Beckett

[57]  ABSTRACT

A roll sensor is provided for determining the roll angle of a rotatable member. The roll sensor includes a plurality of elements arranged in a predetermined manner, each element having a first state and a second state. A controller controls the respective state of the plurality of elements. A detector detects an output of the elements which are in the first state. A liquid responsive to the rotation of the rotatable member causes the output of at least one of the elements in the first state detected by the detector to be different than the output of the remaining elements in the first state detected by the detector to determine the roll angle of the rotatable member.

42 Claims, 25 Drawing Sheets

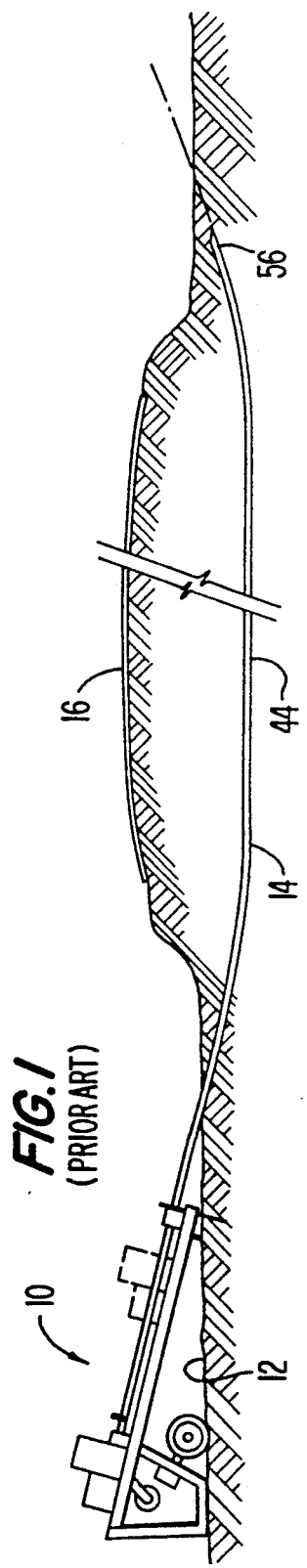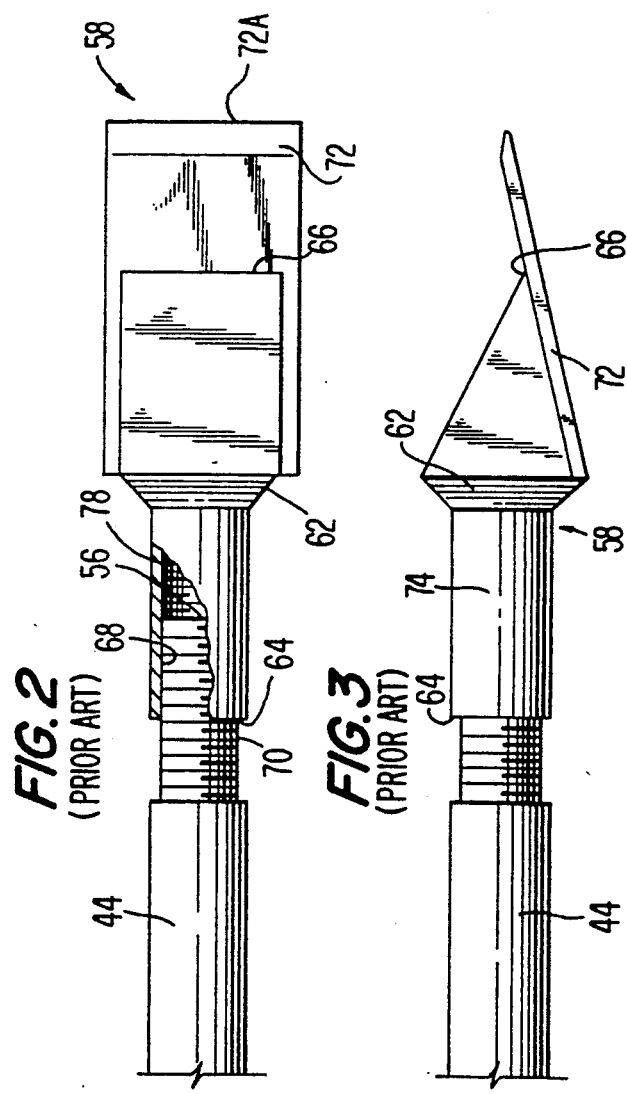
FIG.1 (PRIOR ART)
FIG.2 (PRIOR ART)
FIG.3 (PRIOR ART)

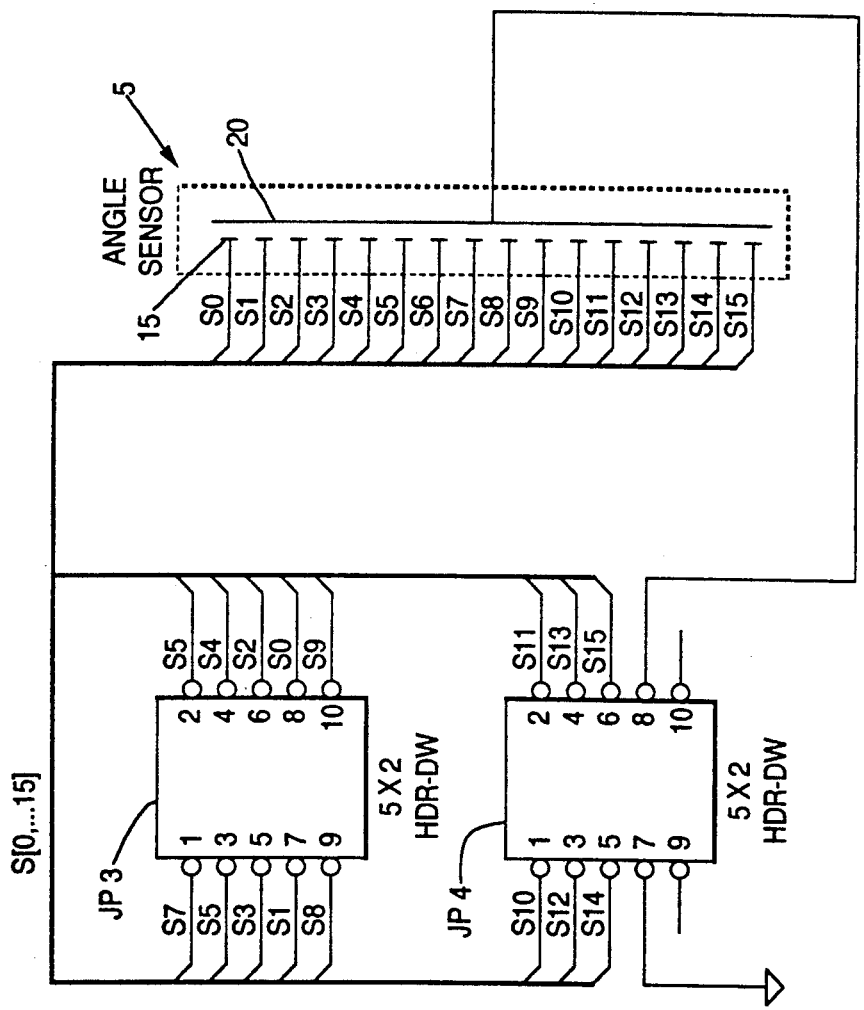

FIG. 7A
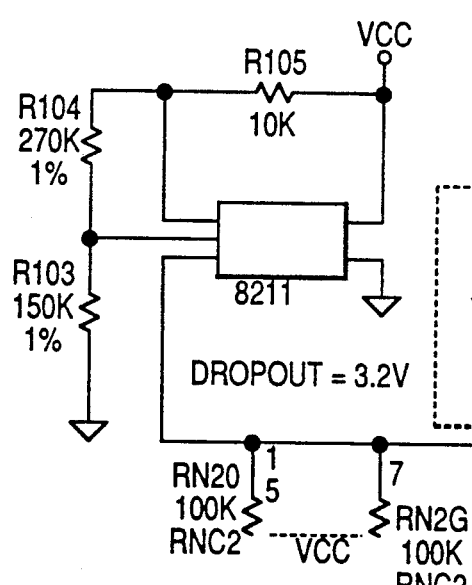
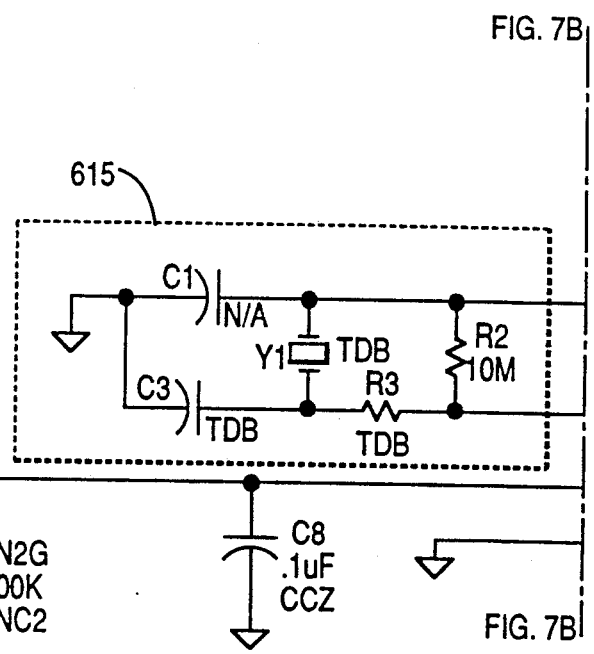

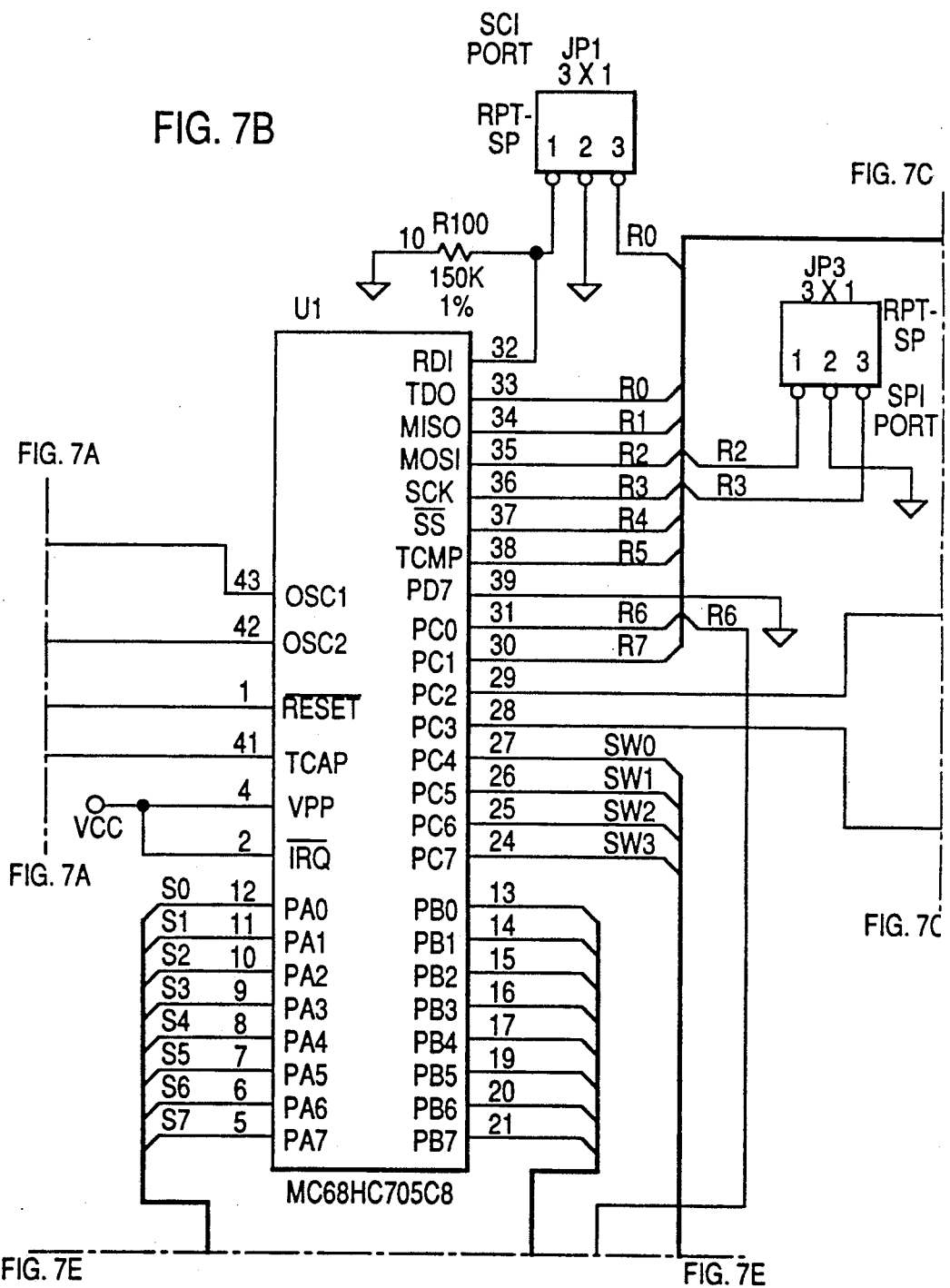

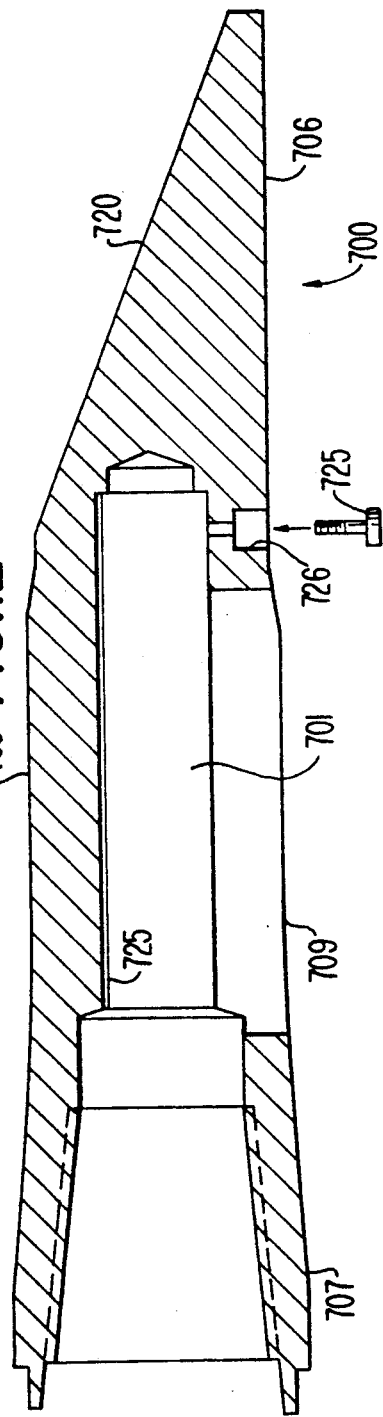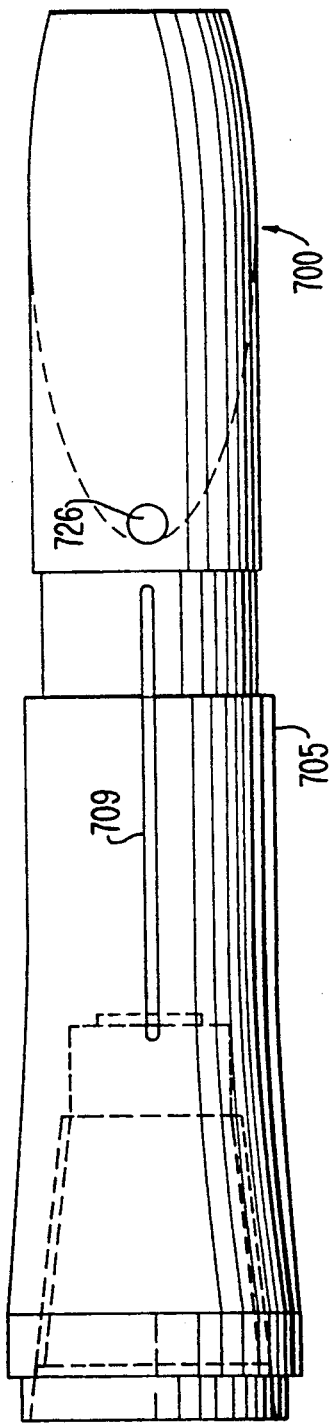

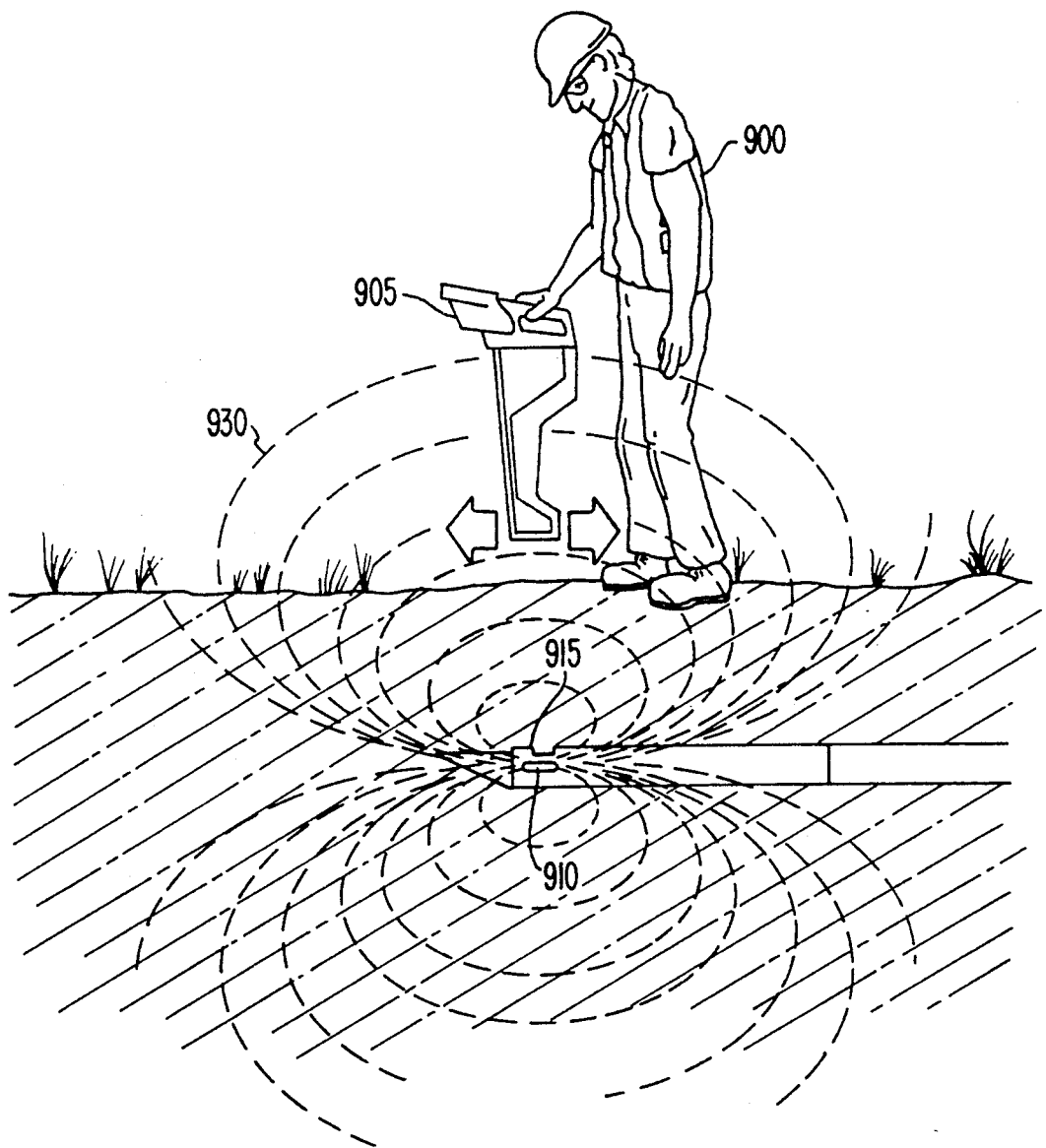

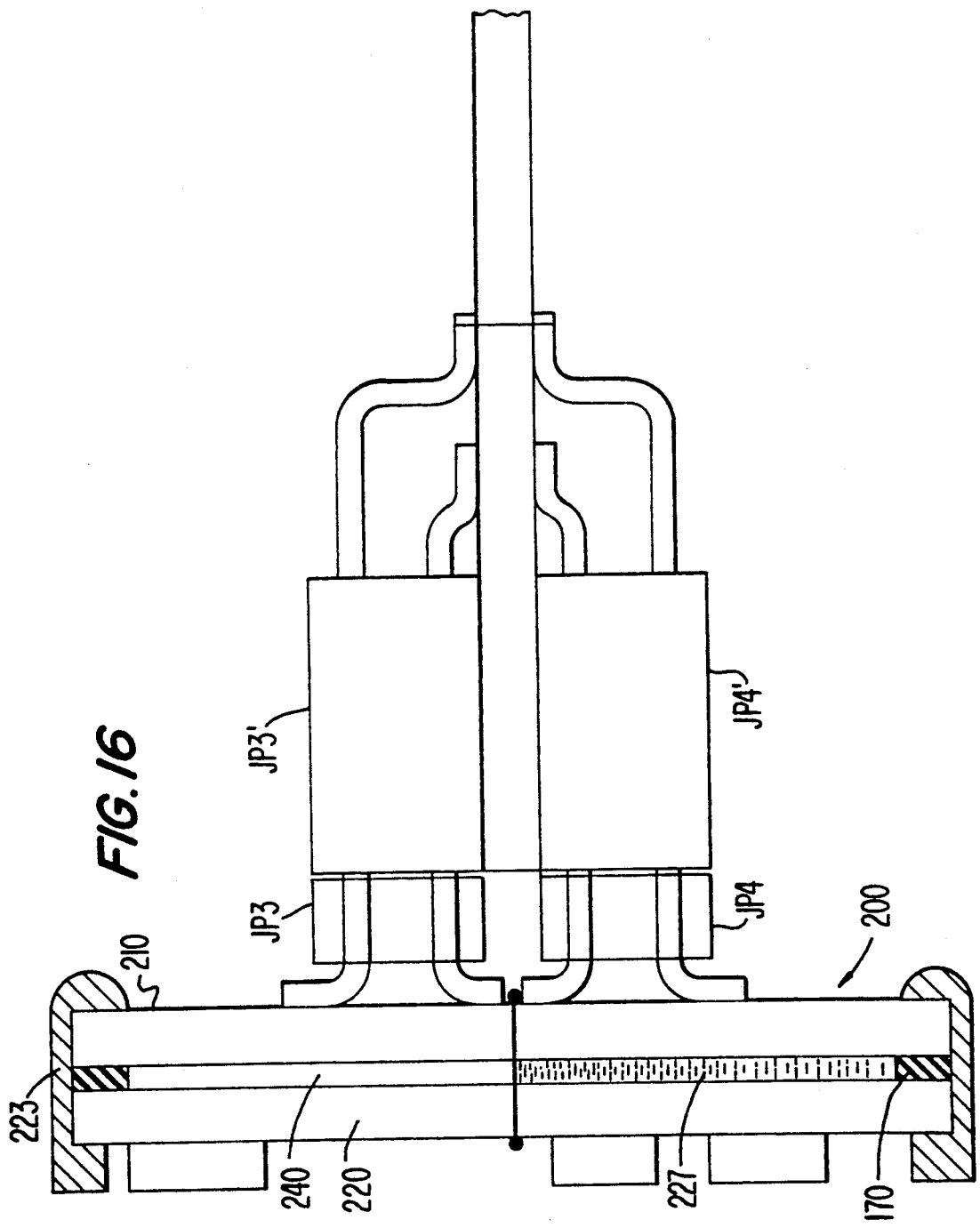

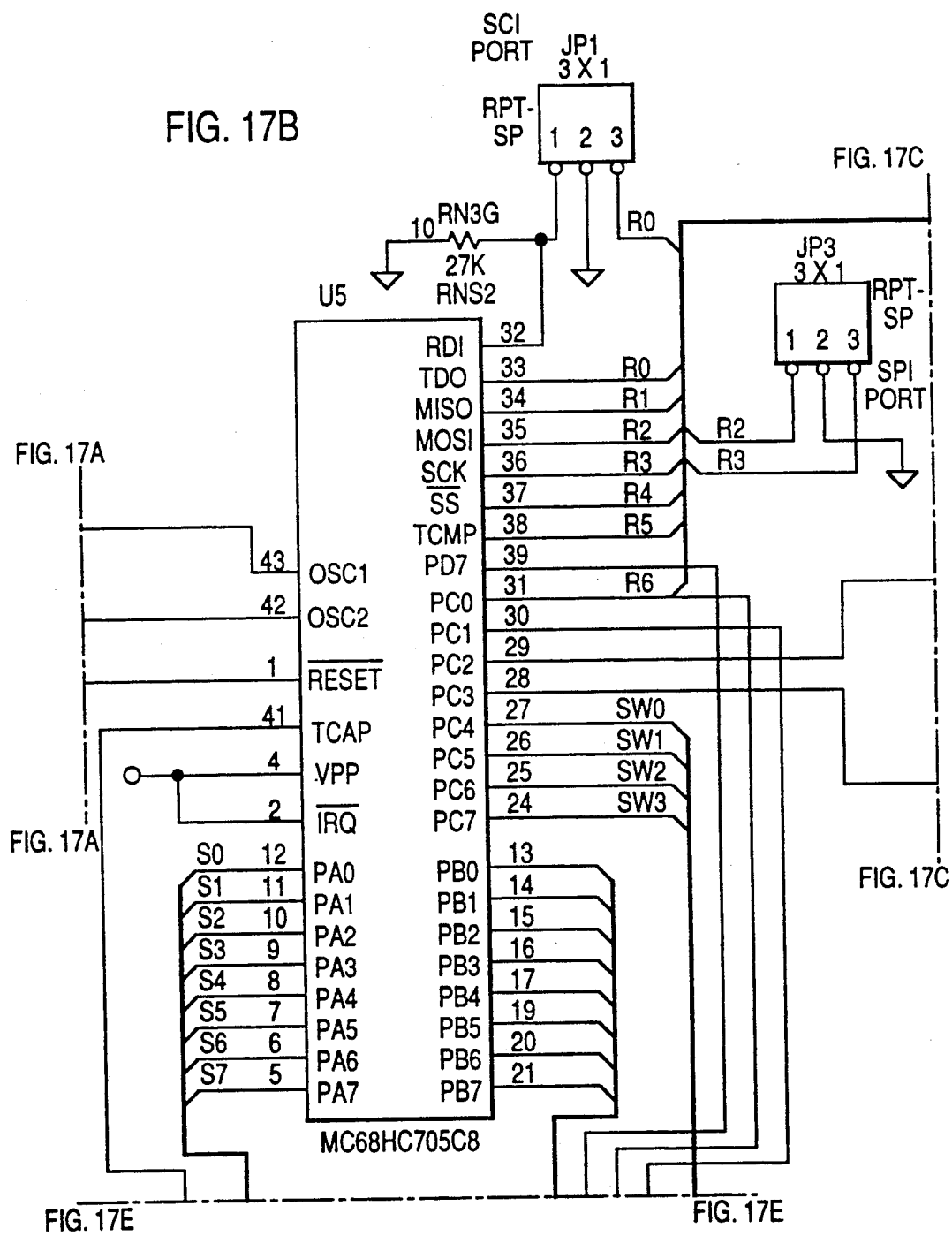

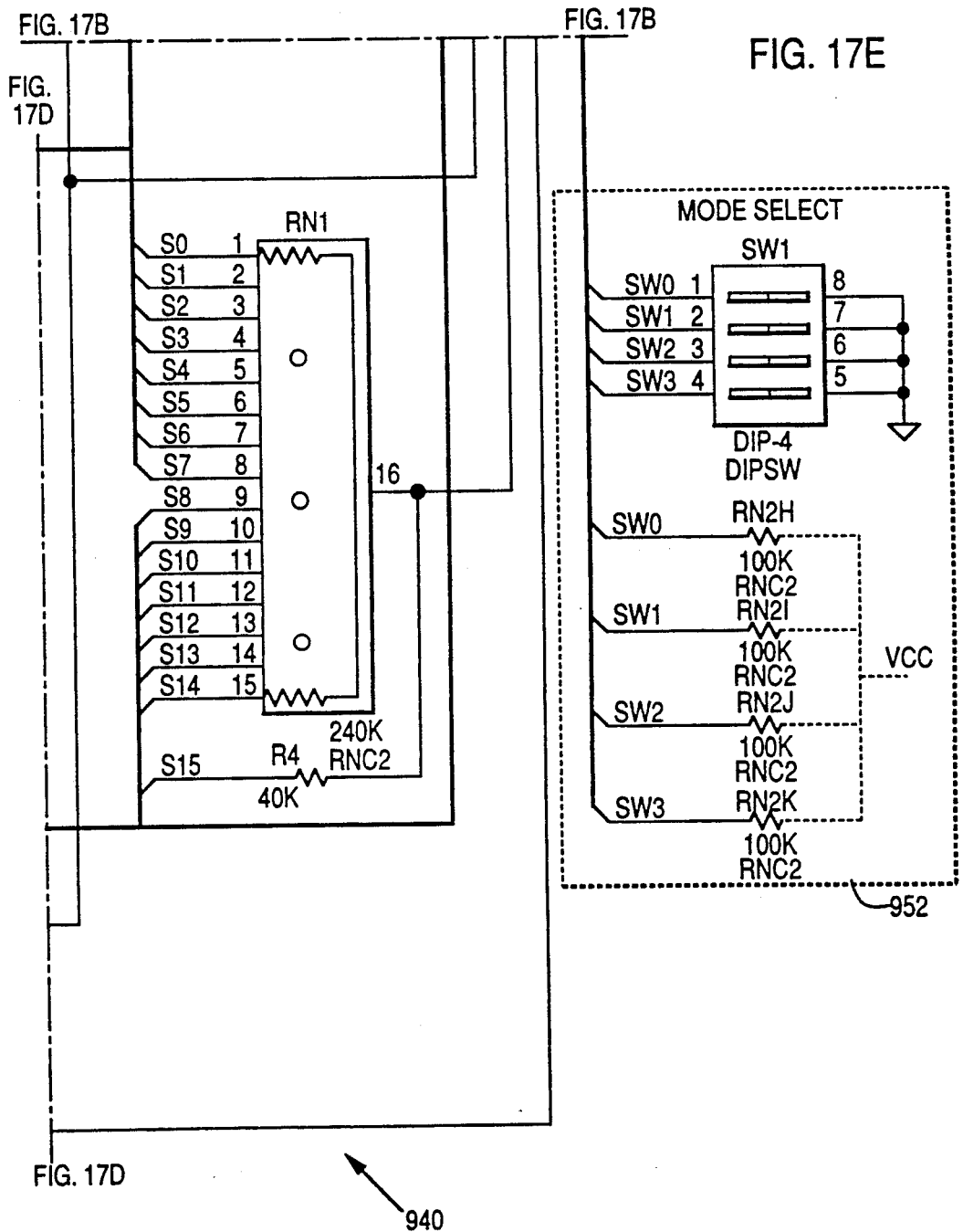

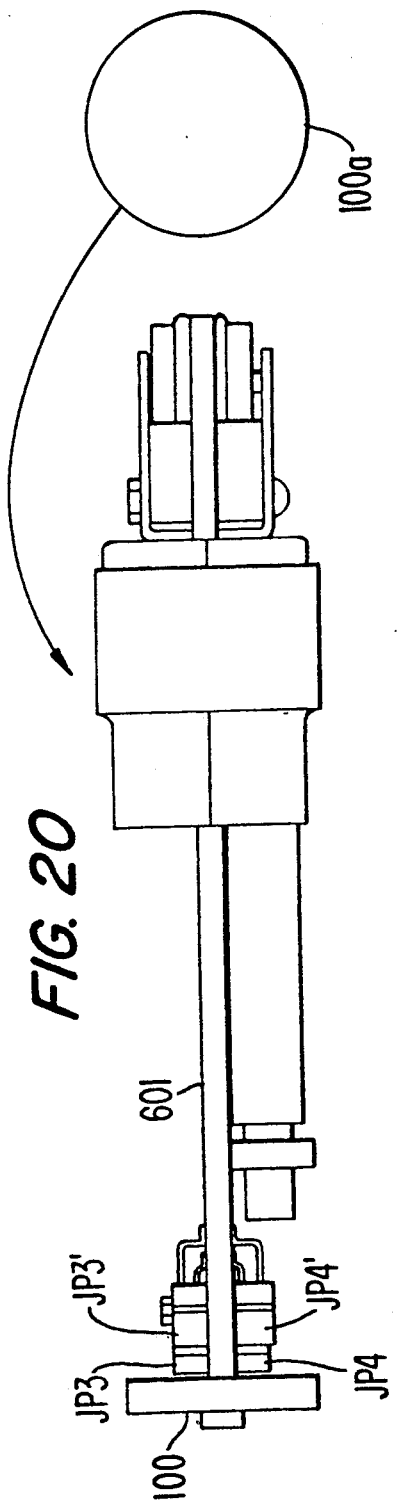

ANGLE SENSOR FOR A STEERABLE BORING TOOL

This application is a continuation of application Ser. No. 07/539,699, filed Jun. 18, 1990 now abandoned.

CROSS-REFERENCE TO RELATED APPLICATIONS

The present application is related by subject matter to commonly assigned, copending application Ser. No. 07/539,551, entitled "Angle Sensor Using Thermal Conductivity For A Steerable Boring Tool" filed Jun. 18, 1990.

TECHNICAL FIELD

The present invention generally relates to an angle sensor for determining an orientation of a member in a plane and, more particularly, to a roll angle sensor for determining the roll angle of a steerable horizontal earth boring tool.

BACKGROUND OF THE INVENTION

The determination of the presence and location of concealed underground objects, such as gas and water pipes, power cables, and telephone and CATV cables or conduits, is a necessary prerequisite to excavation and/or the laying of new lines or cables. In some applications, an underground steerable boring tool is utilized to form an underground tunnel in which cables, telephone lines, etc. are subsequently positioned. When using such a steerable boring tool, it is important to know the location are orientation of the boring tool relative to underground objects to be able to appropriately steer the boring tool and thus position the new lines or cables to avoid existing lines and cables.

One method of boring is described in commonly assigned, U.S. Pat. No. 4,953,638 (the '638 patent) filed on Jun. 27, 1988, incorporated herein by reference. As generally indicated in FIGS. 1 to 3, the method includes positioning a boring machine on the surface of the earth adjacent a selected borehole entry point. The boring machine includes facilities to axially advance and to selectively rotate a drill string. The present invention, however, is not restricted to the method in the '889 application, but has broad applicability to other methods as well, such as positioning the boring machine in a subsurface pit. The drill string is typically in the form of a plurality of lengths of pipe which are provided with male threads on a first end and female threads on a second end so that the lengths of pipe may be interconnected together in sequence to provide a drill string. At the end of the drill string, a drill bit as shown in FIGS. 2 and 3 is provided for performing the boring operation. The drill bit includes a blade which is inclined at an angle to the axis of the drill string to which the bit is attached. The angled blade of the illustrated drill bit generates a non-axisymmetric resultant force as it is thrusted through the ground, causing it to deviate off a straight line path if the bit is not rotated as it is advanced.

The drill string is simultaneously rotated and advanced by means of the boring machine to establish a borehole in the earth. The drilling operation wherein the pipe is simultaneously rotated and axially advanced is continued until a change in direction of the borehole is desired, such as to avoid a known obstacle or to correct a course deviation. In order to change the direction of the borehole. the following sequence is employed:

1. The rotation of the drill string is stopped.
2. The rotational position of the drill string is oriented so that the drill bit blade is inclined at an angle relative to the axis of the drill string toward the desired new direction of the borehole.
3. The drill string is axially advanced without rotation to axially advance the drill bit a short distance or as far as possible when in difficult drilling conditions such that the blade moves the drill bit in the earth toward the new desired direction.
4. Simultaneous rotation and axial advancement of the drill string may be resumed for a short distance.
5. Sequentially repeating steps 1, 2, 3 and 4 until the direction of the borehole is in the new direction desired. Thereafter, the drill string is axially advanced and simultaneously rotated until it is again desired to change directions. To again change the direction of the borehole, the above sequence is repeated.

Referring to FIG. 1, the above-described technique will be illustrated. The boring machine is generally indicated by the numeral 10 and is shown resting on the earth's surface 12 and in position for forming a borehole 14 underneath an obstruction on the earth such as a roadway 16. Alternatively, the boring machine may be placed in a subsurface pit, as is well-known to those skilled in this technology. As shown in FIG. 1, by using the machine 10 the direction of the borehole can be changed as the borehole passes under roadway 16. This illustrates how the machine 10 can be utilized to form a borehole 14 under an obstruction without first digging a deep ditch in which to place a horizontal boring machine, and, also, without having to dig a deep ditch on the opposite side of the obstruction where the borehole is to be received.

A typical drill bit 58 is illustrated in FIGS. 2 and 3. The drill bit includes a body portion 62 which has a rearward end portion 64 and a forward end portion 66. The rearward end portion 64 includes an internally threaded recess 68 which receives the external threads 70 at the drill string forward end 56. A blade 72 is affixed to body portion 62. The plane of blade 72 is inclined at an acute angle to the axis 74 of the bit. Axis 74 is also the axis of the drill string 44. The blade 72 is preferably sharpened at its outer forward end 72A. When rotated, the blade cuts a circular pattern.

To form a borehole 14 in the earth, the operator attaches the drill pipe and drill bit to the boring machine, begins rotation of the drill pipe and at the same time, causes the boring machine to linearly advance in the travel path of the frame towards the forward end thereof. The drill bit 58, rotating and advancing, enters the earth and forms a borehole therein. As long as the bit 58 is rotated as it is advanced, the borehole generally follows the axis of the drill pipe; that is, the borehole continues to go in the direction in which it is started. When the borehole is started at the earth's surface to go under an obstruction such as a highway, the borehole must first extend downwardly beneath the roadway. When the borehole has reached the necessary depth, the operator must then change the direction of drilling so as to drill horizontally. This can be accomplished in the following way. When it is time to change direction, the operator stops drilling and rotates the drill string so that the drill bit blade 72 is oriented in a desired direction. In the situation illustrated in FIG. 1, the direction of the borehole is first changed so that instead of being inclined downwardly, it is horizontal. To effect such a change in direction, the operator will rotate the drill string until an indicator indicates that the blade 72 is facing downwardly as in FIG. 3, so as to cause the drill bit to be deflected upwardly when advanced without rotation.

With rotation stopped and the blade properly oriented, the operator causes the drill machine to move forward without rotating the drill pipe. After forcing the bit as far as possible, the operator may begin rotation of the drill bit and continue to advance the drill string for a short distance. This facilitates the turning process in some soils. The procedure may be sequentially repeated until the direction of drilling has changed to that which is desired. After the borehole has been oriented in the desired direction, such as horizontal, the drilling can continue by simultaneous rotation and advancement of the drill string, adding new lengths of drill pipe as necessary until it is again desired to change direction of drilling.

Other boring techniques are also commonly utilized. For example, in a percussive mole such as shown in U.S. Pat. No. 4,907,658 to Stangl et al. which is incorporated herein by reference, the forward or boring end generally includes an anvil which is hit by an internal striker powered by compressed air. Generally, the rearward end of the mole is connected to a whip hose which in turn is connected to a flexible air hose connected to a source of compressed air on the surface. The percussive mole can also be adapted to both push or pull pipes through the ground.

As discussed above, the orientation of the angled blade of the drill bit determines the direction in which the boring tool will advance when it is thrusted through the ground without rotation. Thus, in order to appropriately steer boring tools such as those described above in a particular direction, the orientation of the angled blade must be known accurately. Addititonally, this angular orientation information must be effectively presented to the operating crew in order to permit efficient underground boring to be carried out.

The prior art contains a number of techniques of determining this angular orientation information. U.S. Pat. No. 4,714,118 to Baker et al., for example, discloses a method and apparatus for monitoring the roll angle of a boring device. The arrangement includes a cylindrical support housing and an electrical resistor element mounted concentrically about an inner surface of the housing. The resistor element forms part of an overall potentiometer which also includes a brush or contact member extending radially from and mounted to a support arm. As the boring device rotates, the resistor element rotates relative to the brush, thereby increasing or decreasing the resistance of the potentiometer. This permits a determination of roll angle in accordance with the resistance.

Another prior art roll sensor is disclosed in U.S. Pat. No. 4,672,753 to Kent. This type of sensor provides 360° of roll angle indication but does not lend itself to miniaturization and is difficult to manufacture.

Another means of indicating roll angle utilizes one or more mercury switches. Such a roll sensor typically can provide only one or two position indications within 360° of rotation. Therefore, actual tool face positioning for a desired steering direction must be relative to one of these positions. This is accomplished by marking the drill string and rotating the desired amount therefrom. Since the actual tool face angle cannot be measured (unless the desired tool face angle happens to coincide with a position where the mercury switch is in the ON position), errors can occur due to the incorrect marking of the reference position, incorrect amount of rotation therefrom, or from windup in the drill string. Additionally, creating a narrow ON position with a mercury switched device creates manufacturing difficulties. Further, these switches exhibit inconsistent operation when subjected to vibration or when inclined more than 10–20 degrees from the horizontal as might occur when boring down a steep hill.

Mechanical systems for determining the orientation, or roll angle, of the blade have physically marked the position of the blade on a first length of drill pipe. As each successive length of drill pipe is added, a corresponding mark is placed on the drill pipe. This process is cumbersome, time-consuming, and inaccurate.

In order to appropriately steer a boring tool in a particular direction, an operator must be alerted that the drill is not on the proper course due to obstacles. While electromagnetic locating techniques may be used to effectively map out underground obstacles such as pipes and cables, other obstacles such as rocks and tree roots are often not discernible from a visual inspection of the surface features and cannot be located using electromagnetic techniques. An operator must nonetheless be made aware of such obstacles and counteract their effect on the drill bit in order that the borehole does not deviate off the intended path and the boring equipment is not damaged. Thus, it would be desirable to provide a device which alerts an operator that the drill is being deflected off course by metallic obstacles as well as rocks and/or roots. Such a tracking or location system would allow the operating crew to determine the location and depth of the drill bit relative to a desired path for the bore and to orient the bit to maintain this path whenever deviations occur.

SUMMARY OF THE INVENTION

Accordingly, it is an object of the present invention to provide an angle sensor which provides an accurate determination of the orientation of a member in a plane despite being subject to shock, vibration, severe environmental conditions, and steep pitch angles.

It is a further object of the present invention to provide an angle sensor which is simple to manufacture, easy to operate, and accurate.

In accordance with the present invention, an angle sensor for determining an orientation of a member in a plane is provided. The angle sensor includes an array of electrical elements which have a predetermined relationship to the orientation of the member in the plane. A fluid responsive to movement of the rotatable member varies an electrical characteristic of at least one of the electrical elements relative to the remaining electrical elements. A detecting circuit detects the electrical characteristics of the electrical elements. A determining means coupled to the detecting circuit determines the orientation of the member in the plane in accordance with the detected electrical characteristics of the electrical elements and the predetermined relationship of the electrical elements to the orientation of the member in the plane.

Also in accordance with the present invention, a method of determining an orientation of a member in a plane is provided. First, electrical elements are arranged so as to have a predetermined relationship to the orientation of the member in the plane. An electrical characteristic of at least one of the electrical elements is varied relative to the remaining electrical elements in response to movement of the member. The electrical characteristics of the electrical elements are detected and the orientation of the member in the plane is determined in accordance with the detected electrical characteristics and the predetermined relationship of the electrical elements to the orientation of the member in the plane.

Also in accordance with the present invention, a sensing device for determining an orientation of a member is provided. The sensing device comprises at least two angle sensors, each angle sensor comprising an array of electrical elements which have a predetermined relationship to the orientation of the member in a respective plane. A fluid responsive to movement of the rotatable member varies an electrical characteristic of at least one of the electrical elements relative to the remaining electrical elements in each array. A detecting circuit detects the electrical characteristics of the electrical elements. A determining means coupled to the detecting circuit determines the orientation of the member in accordance with the detected electrical characteristics of the electrical elements and the predetermined relationship of the electrical elements to the orientation of the member in the respective planes.

Also in accordance with the present invention, a method of determining an orientation of a member is provided. First, at least two arrays of electrical elements are arranged so as to have a predetermined relationship to the orientation of the member in respective planes. An electrical characteristic of at least one of the electrical elements in each array is varied relative to the remaining electrical elements in each respective array in response to movement of the member. The electrical characteristics of the electrical elements in each array are detected and the orientation of the member is determined in accordance with the electrical characteristics and the predetermined relationship of the plurality of elements to the orientation of the member in the respective planes.

BRIEF DESCRIPTION OF THE DRAWINGS

A more complete appreciation of the present invention and many of the attendant advantages thereof will be readily obtained as the invention becomes better understood through the following detailed description when read in connection with the accompanying drawings.

FIG. 1 illustrates a prior art underground drilling apparatus.

FIGS. 2 and 3 illustrates a prior art drill bit.

FIG. 6 is a schematic diagram of the angle sensor of FIG. 4.

FIG. 12 is a cross-sectional view of a steerable drill bit within which the transmitter housing of FIG. 10 is disposed.

FIG. 13 is a top plan view of the steerable drill bit of FIG. 12.

FIG. 14 illustrates a system in which the present invention may be utilized.

FIG. 16 is a side cross-sectional view of the constructed angle sensor of the embodiment of FIG. 15.

FIG. 20 illustrates an arrangement of two angle sensors.

DETAILED DESCRIPTION OF THE PREFERRED EMBODIMENT

Although the present invention is discussed below in terms of an angle sensor for a steerable boring tool, the invention is more broadly concerned with sensors which determine the direction of gravitational acceleration. Such sensors may be referred to as gravitational encoders. An angle sensor in accordance with a preferred embodiment of the present invention is utilized to determine the direction of gravitational acceleration relative to an array of sensing elements in a transmitter mounted in or behind a steerable horizontal earth boring tool. In certain applications, sensing is only required relative to the roll axis of the boring tool and thus the angle sensor is typically referred to as a roll angle sensor. The roll axis is defined as either the rotational centerline of the boring tool or the centerline of the drill string. In typical applications, these centerlines coincide although some offset in order to accommodate the sensors and their associated circuitry is acceptable. The roll angle sensor is installed in the steerable boring tool in such a way that the sensing elements thereof are in a known, fixed relationship with the steering feature of the boring tool, typically the drill bit or tool face. Thus, the sensor can be used to determine tool face angle relative to the direction of gravity.

Figure 4:
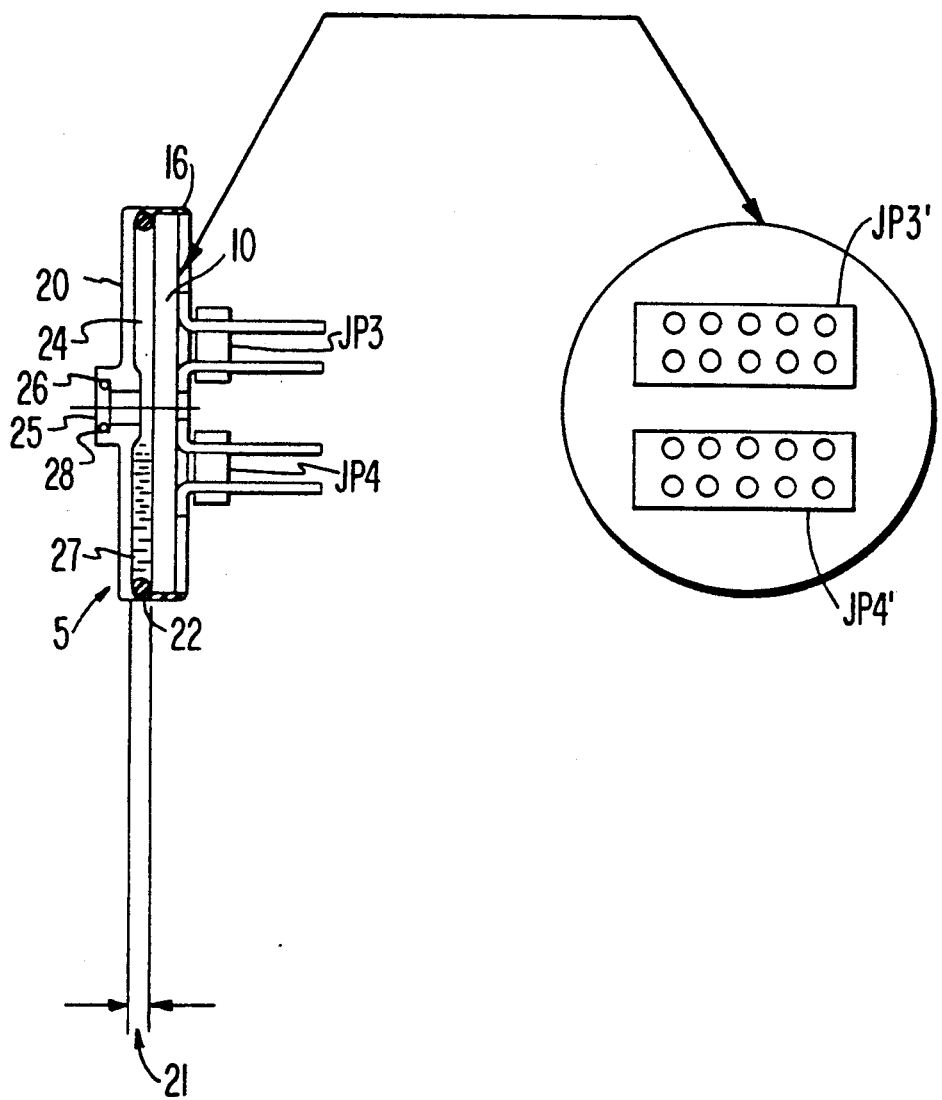
FIG. 4 illustrates an angle sensor in accordance with the present invention.
Figure 5:
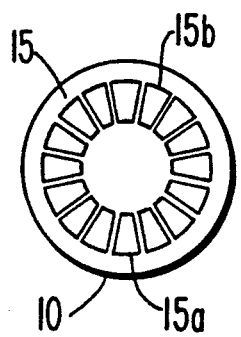
FIG. 5 illustrates the printed circuit board of the angle sensor of FIG. 4 and its connecting relationship with the transmitter connectors.

As discussed above, it is important that an operator have the capability of quickly and accurately determining the orientation of the drill bit blade in order to appropriately steer the boring tool. The ability to quickly determine the orientation reduces the time needed to form the borehole. The ability to accurately determine the orientation also enables the operator to better control the path followed by the boring tool. The present invention uses a roll angle sensor 5, as shown in FIGS. 4 and 5 for example, mounted in the drill bit and having a fixed and known relation to the blade. Roll angle sensor 5 provides a direct and accurate indication of the orientation of the blade to the operator through the use of associated transmitter and receiver elements described below.

A roll angle sensor in accordance with a first embodiment of the present invention will be described with reference to FIGS. 4 and 5. The roll angle sensor of the first embodiment utilizes stored charge to determine a roll angle of a boring tool. Angle sensor 5 includes sixteen capacitor electrode plates 15 which are arranged in a circular array on a substrate 10. Preferably, substrate 10 is a circular alumina ceramic disc which is approximately one inch in diameter, although it will be readily appreciated that the physical characteristics of the sensor will vary in accordance with the apparatus in which the invention is implemented. Capacitor electrode plates 15 preferably comprise a metal such as a silver/platinum alloy. The silver platinum alloy is screened on and then fused into the ceramic disc. The silver facilitates the soldering of electrical connections to the capacitor electrodes. Openings are formed through ceramic disc 10 such as by a laser in order to couple the electrodes to external circuitry.

Cup-shaped member 20 is placed over the capacitor electrode plates and attached to ceramic disc 10 by crimping the outer peripheral edges of cup-shaped member 20 over the outer edge of ceramic disc 10 as indicated at 16 and sealing the resultant structure with a silicone greased elastomeric O-ring 22. Cup-shaped member 20 is designed such that when it is crimped over the outer edge of ceramic disc 10, it makes electrical contact with a conductive ring (not shown) positioned on the outer planar surface of ceramic disc 10. This electrical contact electrically grounds cup-shaped member 20. Cup-shaped member 20 is, in effect, a grounded electrode common to all the capacitive electrodes 15. Cup-shaped member 20 is preferably formed of an inert material such as stainless steel or anodized aluminum. The separation 21 between the inner planar surface of cup-shaped member 20 and the inner planar surface of ceramic disc 10 is approximately 50 to 60 thousandths of an inch (0.050 to 0.060"). Cup-shaped member 20 and ceramic disc 10 define an interior space 24. As illustrated in FIG. 4 and discussed in greater detail below, sensor 5 is coupled via male connectors JP3 and JP4 to female connectors JP3' and JP4' of transmitter 600. Transmitter 600 includes sensor control and data acquisition circuitry as further detailed in FIG. 7.

Capacitor plates 15 are covered with a one to two mil thick coating of a high dielectric material, preferably having a dielectric constant of approximately 50, although other values may be used. The dielectric coating should not have any holes or openings therethrough. A preferred technique for forming the dielectric coating comprises screening a first high dielectric constant layer of barium titanate onto ceramic disc 10 and fusing the layer at high temperature. A second layer of barium titanate is then screened on and fused. Statistically, any holes or openings formed in the first and second layers will not coincide. Next, a relatively low melting point glass having fewer holes, but a relatively low dielectric constant is placed over the second fused layer. It will be apparent to those skilled in the art that a dielectric coating having no holes may be provided by utilizing various thin dielectric coatings such as polymer coatings with a relatively high dielectric constant.

A conductive fluid 27 is placed within the interior space or cavity 24 such that the fluid covers approximately one-half of the plurality of capacitive electrodes. The actual number of electrodes covered is not critical to the present invention. Any number of capacitive electrodes from one through one less than the total number of electrodes may be covered. An amount of fluid covering approximately one-half of the capacitive electrodes is a manufacturing convenience. An opening 26 is provided as a fill hole and is sealed by screw 25 and elastomeric O-ring 28. The conductive fluid 27 is preferably a liquid having moderate to low resistivity such as salt water, ethyl glycol, mercury, or cupric nitrate. Methyl alcohol has also been found to work well and is, in fact, the preferred liquid. Assuming the liquid has a moderate to low resistivity, it effectively forms an electrode common to the individual capacitor electrodes. Since the bulk resistance of the liquid is preferably low, the liquid provides a relatively low resistance path to cup-shaped member 20.

When angle sensor 5 is mounted in the drill bit and set on edge, ceramic disc 10 is generally vertical and thus conductive fluid 27 runs to the bottom of cavity 24 under the influence of gravity and lies between a plurality of the capacitor electrode plates 15 and the inner planar surface of cup-shaped member 20.

Fluid dynamics, the chemical reaction between the fluid and the various sensor components and thermal effects must be considered when implementing the invention. The viscosity of the fluid determines the damping effect or responsiveness of the angle sensor. For example, methyl alcohol has a very low wetting coefficient and very low viscosity. Thus, it provides for a very fast responding angle sensor. Alternatively, for example, ethyl glycol could be used for a slower responding, damped angle sensor since the viscosity of ethyl glycol is higher than that of methyl alcohol. The conductive fluid must be chemically compatible with the materials comprising cup-shaped member 20, elastomeric O-ring 28, and the dielectric coating. Since the angle sensor may be subjected to adverse environmental conditions, as in a boring tool, a conductive liquid must not freeze or boil over the intended operating and storage temperature range. Methyl alcohol and ethyl glycol have excellent freezing temperature characteristics and the above-described sensor assembly is preferably constructed to withstand a high internal vapor pressure, thus raising the effective boiling points of liquids contained therein.

FIG. 6 is a schematic diagram of the stored charge angle sensor 5. As illustrated, capacitor plates 15 and cup-shaped member 20 constitute sixteen individual capacitors. Signal lines S0–S15 are respectively coupled to each of the capacitor electrodes 15 through connectors JP3 and JP4. Similarly, cup-shaped member 20 is coupled to the common (ground) of the main circuit board through connector JP4. The signals generated at the capacitor plates 15 are transmitted via signal lines S0–S15 to a beacon transmitter as described below.

The capacitance of a parallel plate capacitor is given by the equation $$C = \kappa \frac{\epsilon_0 A}{d}$$

where $\kappa$ is the dielectric constant of a dielectric disposed between the plates, $\epsilon_0$ is the permittivity of free space, A is the area of the capacitor plates and d is the separation of the plates. Without the conductive fluid disposed between the plates thereof, each capacitor and the wiring associated therewith has a capacitance of about 10 pF. When the conductive liquid is opposite a given capacitive electrode, the capacitance is typically in a range of about 60 pF to about 100 pF. The capacitance values given here are illustrative of a preferred embodiment but the invention is not limited in this respect. It is important that the difference in capacitance give rise to a signal which accurately distinguishes capacitors having the conductive liquid disposed between the plates thereof and capacitors not having the conductive liquid disposed between the plates thereof.

Figure 7C:
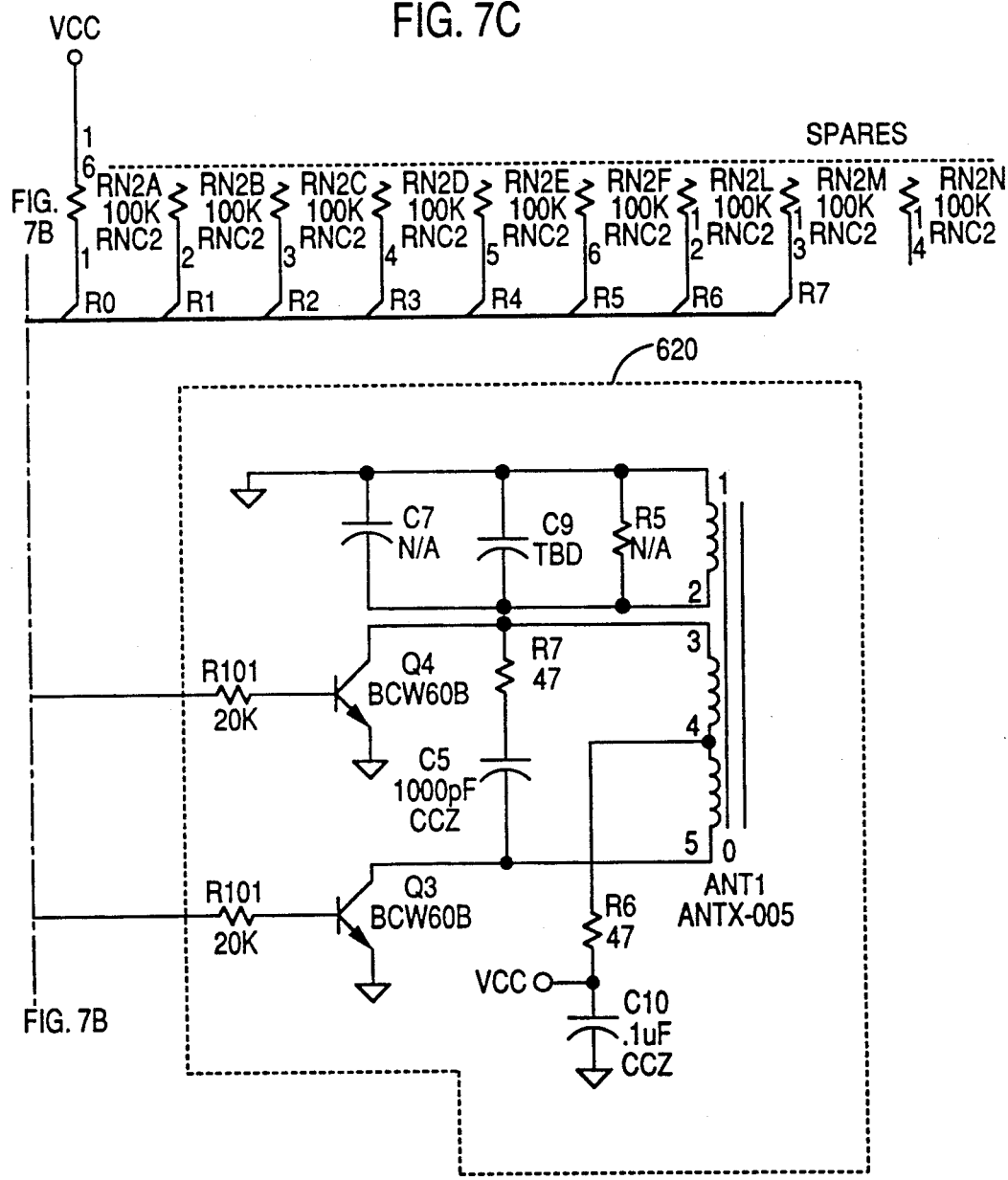
FIGS. 7(A-E) are a schematic diagram of a transmitter for use with the angle sensor of FIG. 4.
Figure 7D:
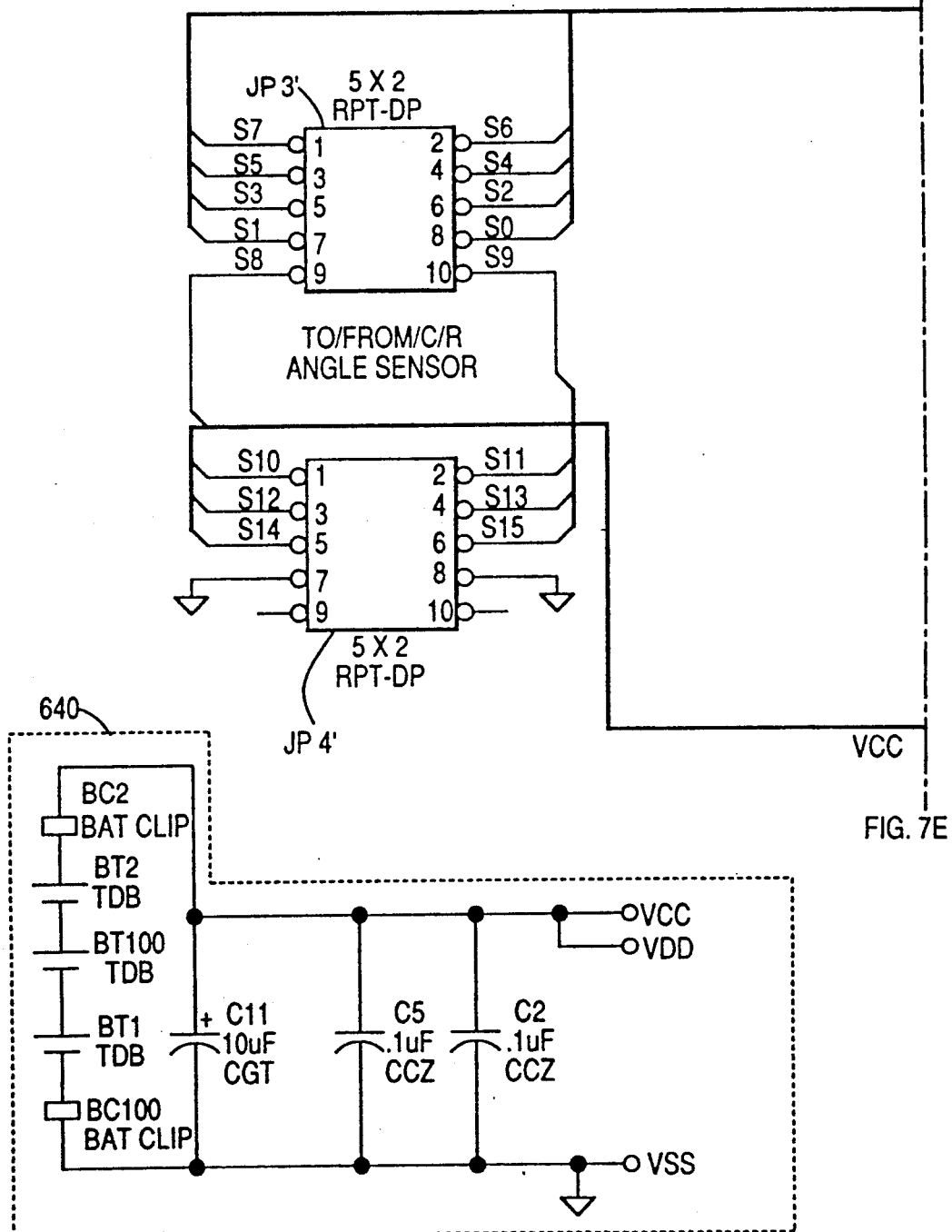
Figure 7E:
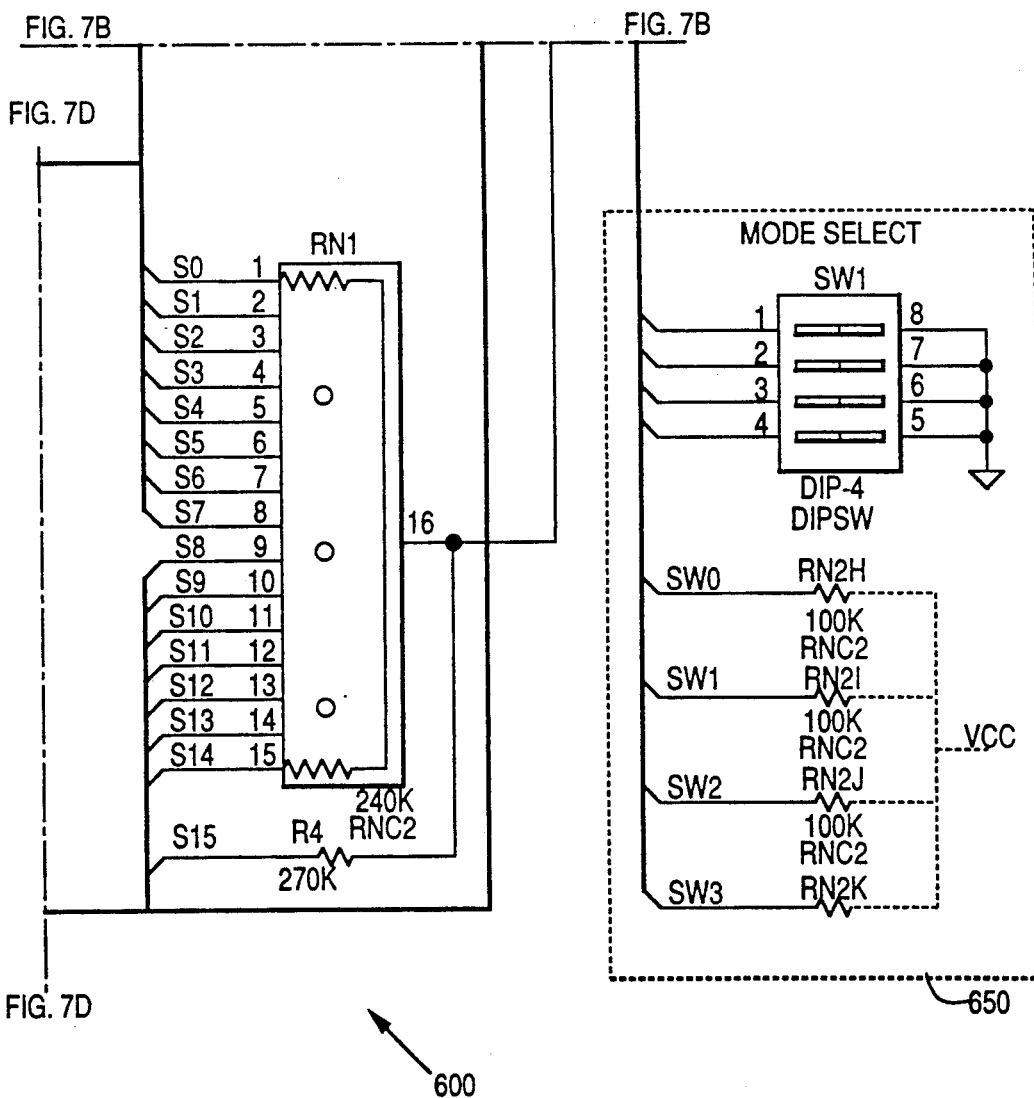

FIG. 7 is a schematic diagram of a beacon transmitter 600 which may be utilized with the present invention. Beacon transmitter 600 is merely illustrative of a transmitter for use with the present invention. Details of transmitter 600 are described in commonly assigned copending U.S. application Ser. No. 07/539,851 entitled "An Improved System For Locating Concealed Underground Objects", expressly incorporated herein by reference thereto, and such details will only be outlined below. The beacon transmitter of FIG. 7 performs two functions. First, it broadcasts a 29,430 Hz electromagnetic field signal to provide accurate tool location. Second, it determines the roll angle of the boring tool relative to gravity and broadcasts the angle via a digital communication system to a compatible receiver. The operation of the beacon transmitter is under the control of a micro-controller such as a Motorola MC68HC705. The micro-controller further controls the operation of the angle sensor and generates the digital signals for transmitting the angle information to the receiver. It will be apparent to those skilled in the art that different transmitters may be designed in order to perform these functions. The beacon transmitter described below is the preferred embodiment for transmitting the angle information to a receiver, but the invention is not limited to a particular transmitter for performing this function.

Referring to FIG. 7, oscillation circuitry 615 including a crystal is coupled to inputs OSC1 and OSC2 of micro-controller U1 for timing and carrier generation purposes. The electromagnetic field signal and the angle information is output via PC2 and PC3 to an antenna through output section 620. Angle sensor 5 is interfaced to beacon transmitter 600 at JP3' and JP4'. Signal lines S0-S7 are respectively coupled to micro-controller input/output pins PA0-PA7 via connector JP3'. Signal lines S8 and S9 are respectively coupled to micro-controller input/output pins PB0 and PB1 via connector JP3'. Signals lines S10-S15 are respectively coupled to micro-controller input/output bits PB2-PB7 respectively.

Power supply 640 supplies the power and the necessary operating voltages for the operation of the beacon transmitter 600. Input section 650 comprises a plurality of DIP switches which may be used by the operator to set selected inputs of micro-controller U1. The input DIP switches may be used, for example, to configure the transmitter to only generate the electromagnetic field signal, or to generate the electromagnetic field signal and transmit angle information. The DIP switches may also be used to configure a duty cycle such that the transmitter transmits for a given period and then "sleeps" or is turned off for a given period in order to conserve battery power. For example, the unit may be programmed to transmit for nine hours and then sleep for fifteen hours. Micro-controller U1 may also test the operation of angle sensor 5 in accordance with a particular setting of the DIP switches. Such procedures may for example include polling the sensor elements to determine whether they are active.

Figure 8A:
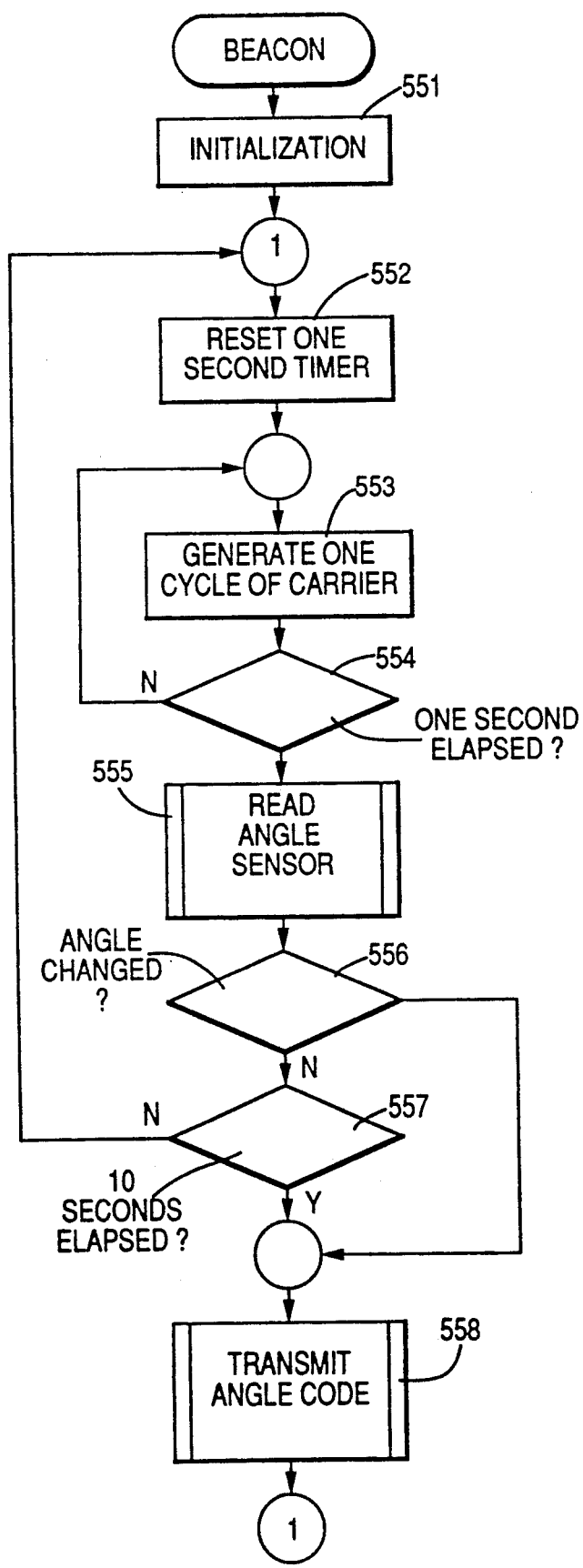
FIGS. 8A-8D are flow charts illustrating the operation of the roll sensor of the present invention.
Figure 8B:
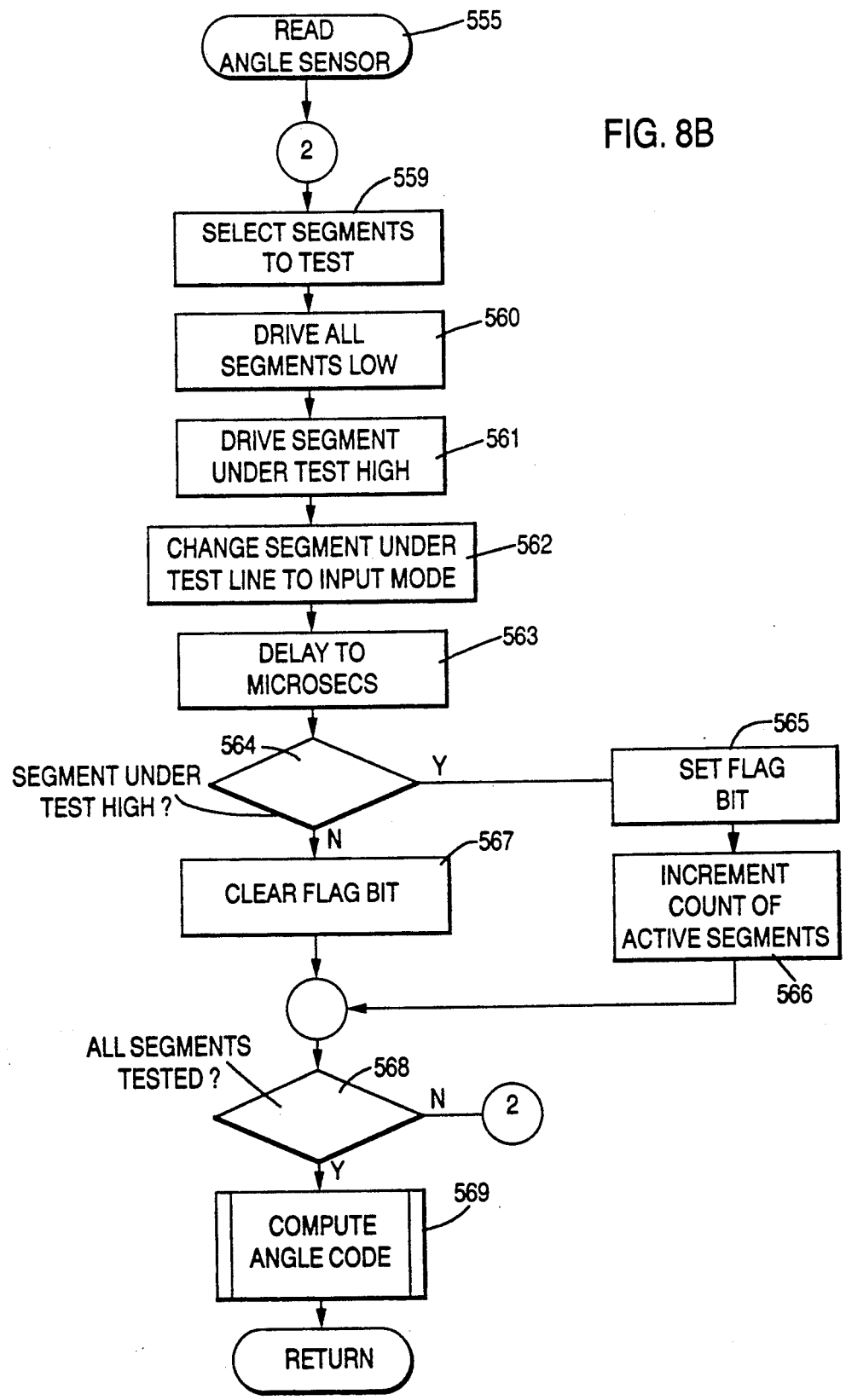
Figure 8C:
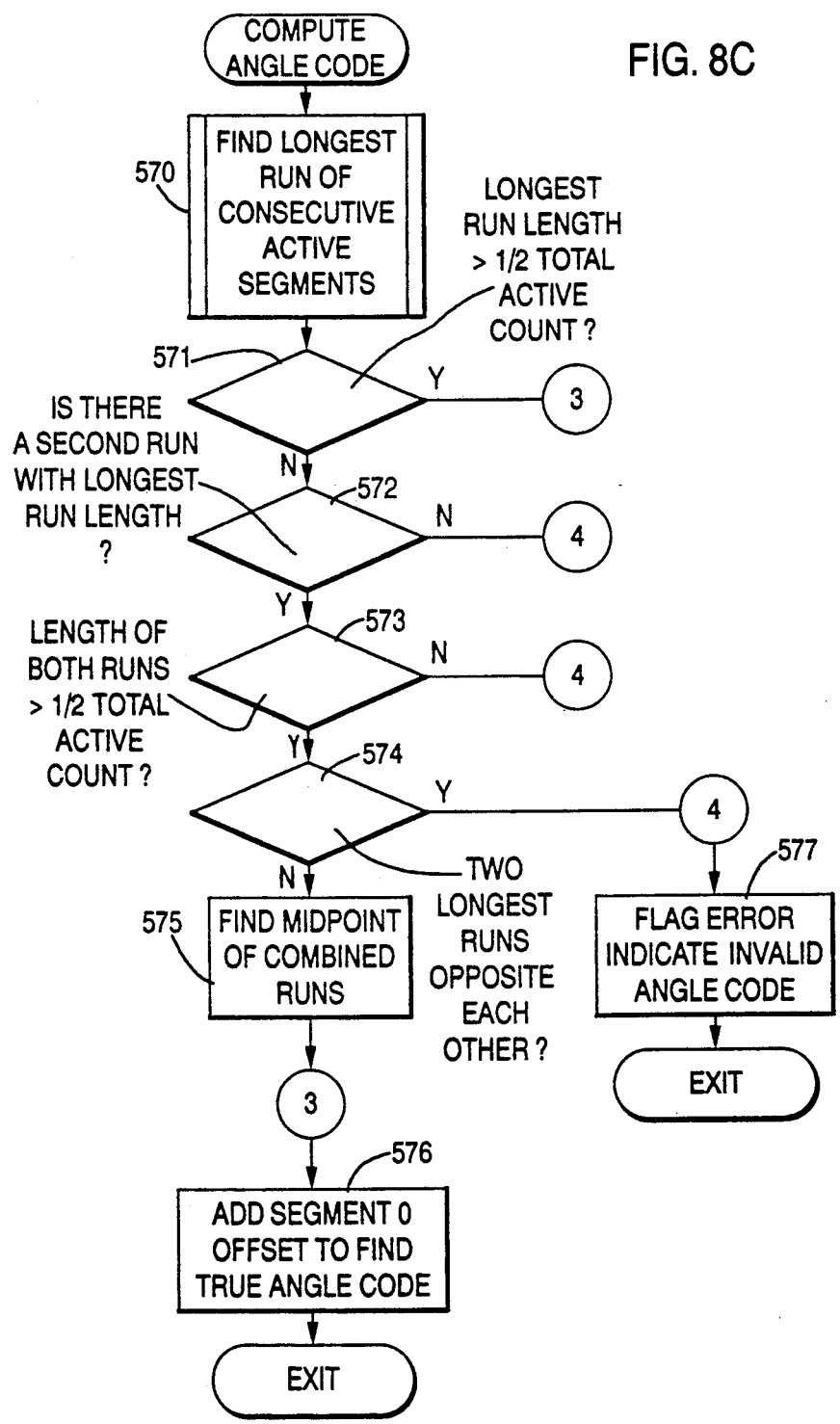
Figure 8D:
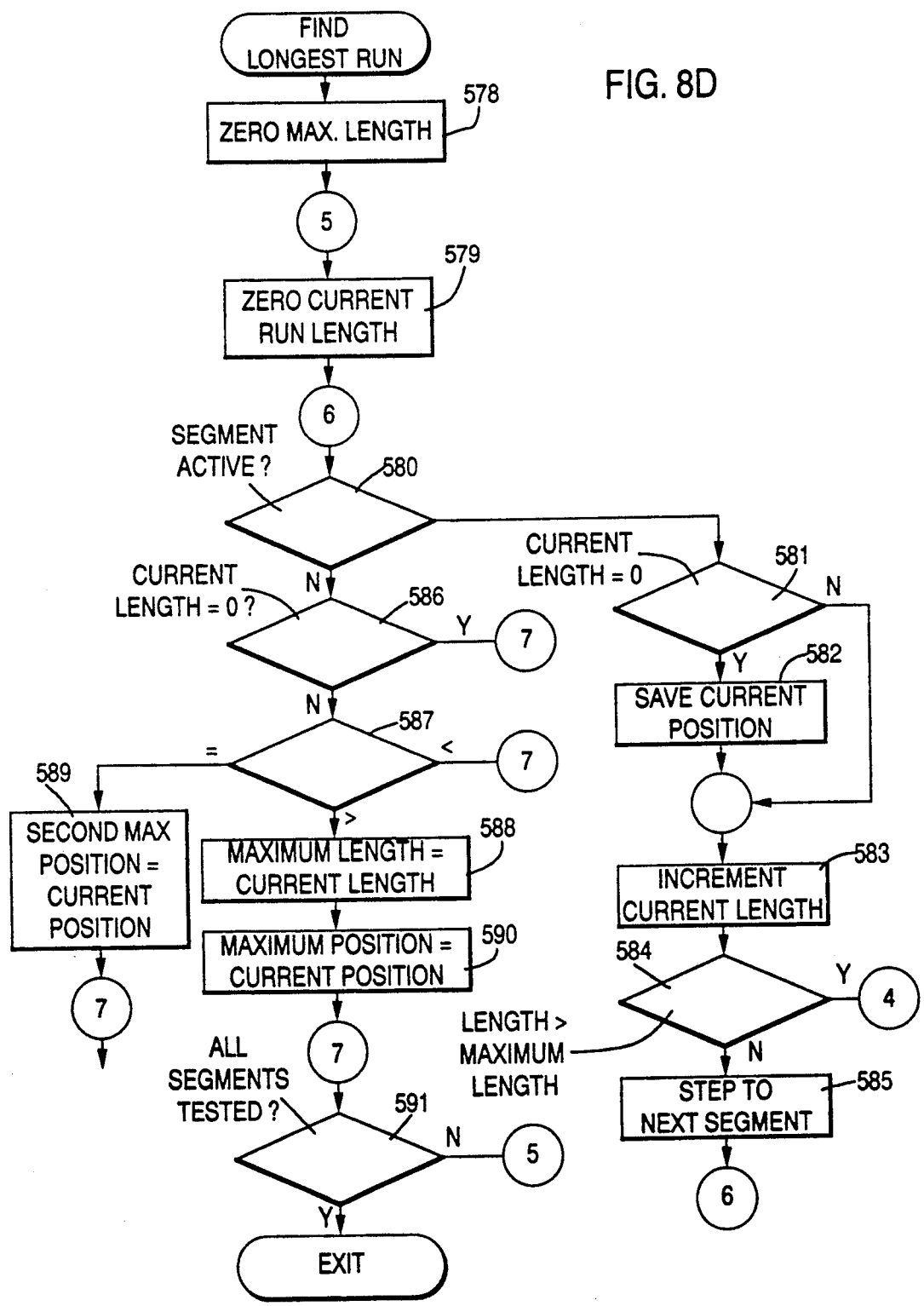

The microcontroller clock is 2 MHz and the carrier frequency is 29.43 kHz. The digital communication system bit rate [BAUD] is 75 Hz. As shown in the flowchart of FIG. 8A, micro-controller U1 samples the angle sensor at one second intervals. That is to say, after initialization procedures (551) including resetting of the one second interval timer (552), one or more transmitter carrier cycles are generated (553) until a one second interval elapses (554). Thereafter, the "Read Angle Sensor" subroutine (555) further detailed in FIGS. 8B, 8C, and 8D is run and subsequently a determination is made as to whether the angle has changed (556) since the last transmission. If it has, micro-controller U1 transmits a new angle (558). If the angle has not changed since the last transmission, the transmission is skipped. However, if the angle has not changed for ten samples (557), the angle is nonetheless retransmitted (558). The carrier signal may be interrupted for internal processing purposes.

A first implementation of angle sensing as illustrated in FIG. 8B is governed by the physics of discharging a charged capacitor. The voltage of a discharging capacitor is described by the equation $V = V_0 e^{-t/RC}$ where $V_0$ is the initial voltage, R is the resistance through which the capacitance C is discharged, and t is time. The quantity RC is known as the time constant of the circuit. In this first implementation, microprocessor U1 discharges each of the sixteen capacitors (560). A selected capacitor (559) is charged (561) by setting the corresponding output bit high in Port A (PA0-PA7) or Port B (PB0-PB7) and programming all the bits of the ports as outputs. The selected capacitor is charged to approximately five volts (5 V) while the other capacitors are maintained in a discharged condition. The selected bit in the port is then programmed as an input (562), thereby connecting the capacitor as a high impedance input to the sensor circuitry. Bit PC0 is held low so the common connection of resistor pack RN1 is maintained close to ground potential.

After a delay (563) as shown in FIG. 8B (about ten microseconds), micro-controller U1 reads (564) the selected bit. If the selected capacitor does not have the conductive liquid disposed between the plates thereof, the RC time constant is determined principally by the stray capacitance of the circuitry and the resistance associated with the particular electrode in question which is 270K. This yields an RC time constant of (270K × 10 pF) or 2.7 microseconds. The input impedance of the Port A and Port B lines connected to the capacitor plates is extremely high since it is a CMOS device. If the fluid is present, the capacitive electrodes will have a capacitance of about 60 to about 100 pF yielding a time constant of at least (270K × 60 pF) or 16.2 microseconds. Micro-computer U1, in this implementation, samples the input associated with a capacitor electrode at approximately 10 microseconds to determine the charge on the electrode. In the preferred embodiment, the transition between high and low, as sensed by microprocessor U1, is approximately 2.5 volts. If the selected capacitor has the conductive liquid disposed between the plates thereof, the time constant is at least 16.2 microseconds and the selected bit will still be high (greater than 2.5 V) after 10 microseconds. If however, the fluid is not present, the selected bit will be low (less than 2.5 V) after 10 microseconds and an appropriate flag bit is cleared (567). Microprocessor U1 upon examining the capacitor plate under test can thus determine whether a given capacitor has conductive fluid 27 disposed between the plates thereof and set an appropriate flag bit high (565) and increment the count of active capacitors when the liquid is present. By sequentially examining all sixteen capacitors (568), microprocessor U1 can determine the location of conductive fluid 27 by examining each flag bit for a high or a low and thus determine the direction of gravitational acceleration relative to the array of capacitors. "Sequentially" as used herein refers to any predetermined order. Since the array of capacitors is in a fixed relationship relative to the drill blade, the orientation of the drill blade may be determined (569).

For example, in the event that the liquid level is only sufficient to be disposed between the plates of one capacitor and assuming that capacitor plate 15a of FIG. 5 is keyed such that when conductive liquid 27 is disposed between plate 15a and grounded cup-shaped member 20, the blade of the drill is angled upwardly or at 0° (i.e. facing downwardly as in FIG. 3). In practice, if at some point in time, micro-controller U1 ascertains that conductive liquid 27 is disposed between plate 15a and cup-shaped member 20, the blade may actually be oriented in a range of 0°±11.25° and thus the present embodiment has a precision of 22.5° or 360/16. In general, the precision may be found in accordance with the relation $$\text{precision} = \frac{360}{n}$$

where n is the number of plates. Thus, the more plates utilized, the more precisely the roll angle may be determined. As discussed below, beacon transmitter 600 will transmit one of a possible sixteen values of the roll angle in accordance with the location of the fluid. For example, if micro-controller U1 determines that conductive fluid 27 is disposed between plate 15h and the metal cup-shaped member 20, beacon transmitter 600 will transmit a signal indicating the blade had rotated 157.5° in a clockwise direction from the position defined as 0°. Again, since the sensor has a precision of 22.5°, the actual blade angle may be within a range from 146.25° to 168.75°.

In a preferred embodiment where the liquid level is disposed between the plates of approximately half of the capacitors, vibrational forces and the like may cause the fluid to break up so that one or two of the "bottom" capacitors or segments do not indicate the presence of the liquid. Additionally, other factors such as a disconnected wire may cause a particular segment to fail to register.

FIGS. 8C and 8D are illustrative of a run length procedure for examining various patterns of flag bits such that accurate readings through an averaging technique may be obtained notwithstanding the aforementioned circumstances. For example, in FIG. 8C the longest run of consecutive active segments with flag bits set high may be determined (570), and if the longest run is greater than half the total of high flags (571), such a determination may be used to determine the true angle code (576). Under some circumstances, however, (572 through 574), the flag bit patterns would be insufficient to determine the true angle code, and an error condition would be indicated (557) thus requiring a new test. Where, however, two longest runs exist and do not appear opposite to each other, such as where three consecutive high bit flags are followed by one low and three more high bits, the midpoint may be determined (575), and the true angle code determined (576) after adding in the zero offset constant or the aforementioned "fixed relationship relative to the drill blade."

As illustrated in FIG. 8D, an exemplary procedure for the determination of the longest run may be obtained by first zeroing or resetting counters for accumulating indications of the maximum and current run lengths (578 and 579). Thereafter, the initially selected segment is determined to be either active or inactive (580), and if active and the current run length is zero (581), the position of said segment is recorded (582). If the current run length is not equal to zero, the current run length is incremented (583). Thereafter, the current run length total is compared with the maximum permissible length (584), and if greater, an error is indicated (577). However, where the error test is negative, the exemplary process is stepped (585) so that the next segment is tested (580). Where the next tested segment is inactive, it is then known that the current run of active segments is finished or that all segments will be inactive. In the latter event, at step 586 the routine would branch to step 591 to determine whether all segments will be tested inactive or, alternatively, will branch to step 587.

At step 587, a determination is made as to whether the current run length is greater than, equal to, or less than the maximum length. If the current length equals the maximum length, it is known that a new run of active segments may be instituted and the new position is recorded (589). If the current length is greater than the currently recorded maximum length, the maximum length is set equal to the current length (588), and the maximum position is also set to the current position (590).

In the event that the current length is less than the currently recorded maximum length, the exemplary procedure would branch to step 591 for a determination of whether all of the segments have been tested. Ultimately, a determination is made as to the longest run of active segments as well as a determination of the second longest run, if it exists.

The above noted procedures for obtaining accurate angle codes are merely exemplary and not exhaustive of the procedures which may be used for such determinations under various operating conditions. Clearly, other similar or equivalent procedures will occur to those skilled in the art for implementing the above-described embodiment. Similar observations may be made with regard to the implementation of the additional embodiments which follow.

A second implementation of this first embodiment utilizes the same arrangement of components as described above. The difference resides in the firmware which controls micro-controller U1. The second implementation is governed by the physics of charging a discharged capacitor. Micro-controller U1 maintains all sixteen capacitors at approximately 5 volts by programming all bits of Ports A and B (PA0-PA7, PB0-PB7) as output bits and setting all the bits high. Bit 0 of Port C is set high so the common connection of resistor pack RN1 is also at approximately 5 volts. To examine an individual capacitor, micro-controller U1 sets the corresponding bit in Port A or Port B low, thereby discharging the selected capacitor. As in the first implementation, the selected pin in the port is then programmed as an input, causing the selected capacitor to be connected as a high input impedance to the sensor circuitry.

Ten microseconds after programming the selected bit as an input, micro-controller U1 reads the selected bit.

If the capacitor does not have conductive fluid 27 interposed between the plates thereof, the capacitor will have charged up to nearly five volts after ten microseconds and the selected bit will be high (i.e. greater than 2.5 V). If the capacitor has conductive fluid 27 disposed between the plates thereof, the bit will still be low (i.e. less than 2.5 V) after ten microseconds.

This second implementation of the first embodiment may have particular utility when certain electrolytes are utilized as conductive liquids in combination with certain metals as the capacitor plates. In practice, thin, reliable insulating films are difficult to form on the capacitor plates. It is well-known that certain combinations of capacitor plates and electrolytes are "self-healing." That is, the insulating film on the plates is a metal oxide, and if it is punctured, an electrochemical reaction between the electrolytes and the metal of the capacitor plates forms new oxide and repairs the damage to the film. Since the second implementation maintains a potential between the capacitor plates and the grounded cup, it can maintain an insulating oxide film on the capacitor plates.

As noted above, the angle is transmitted from the beacon using a communication system described in the incorporated copending application entitled "An Improved System For Locating Concealed Underground Objects." The communication system is a digital system and provides an accurate and efficient means for the transmitter to communicate with the receiver. The communication medium is the electromagnetic field produced by the transmitter. Data and associated control bits are encoded by amplitude modulating the carrier frequency. The communication system uses the standard UART (Universal Asynchronous Receiver Transmitter) non-return-to-zero (NRZ) format.

The roll angle is transmitted from the beacon transmitter of FIG. 7 at predetermined periodic intervals. When the above-ground receiver has been set-up in a proper operation mode to receive information from the beacon transmitter, the roll angle information is received and displayed on an angle display of the receiver.

As noted above, the roll angle assumes one of sixteen values ranging from 0° to 360° in increments of 22.5°. It will be appreciated that the number of possible values transmitted from the beacon transmitter is dependent on the precision of the angle sensor incorporated therein. A more precise angle sensor will have a greater number of possible angle values.

Figure 9:
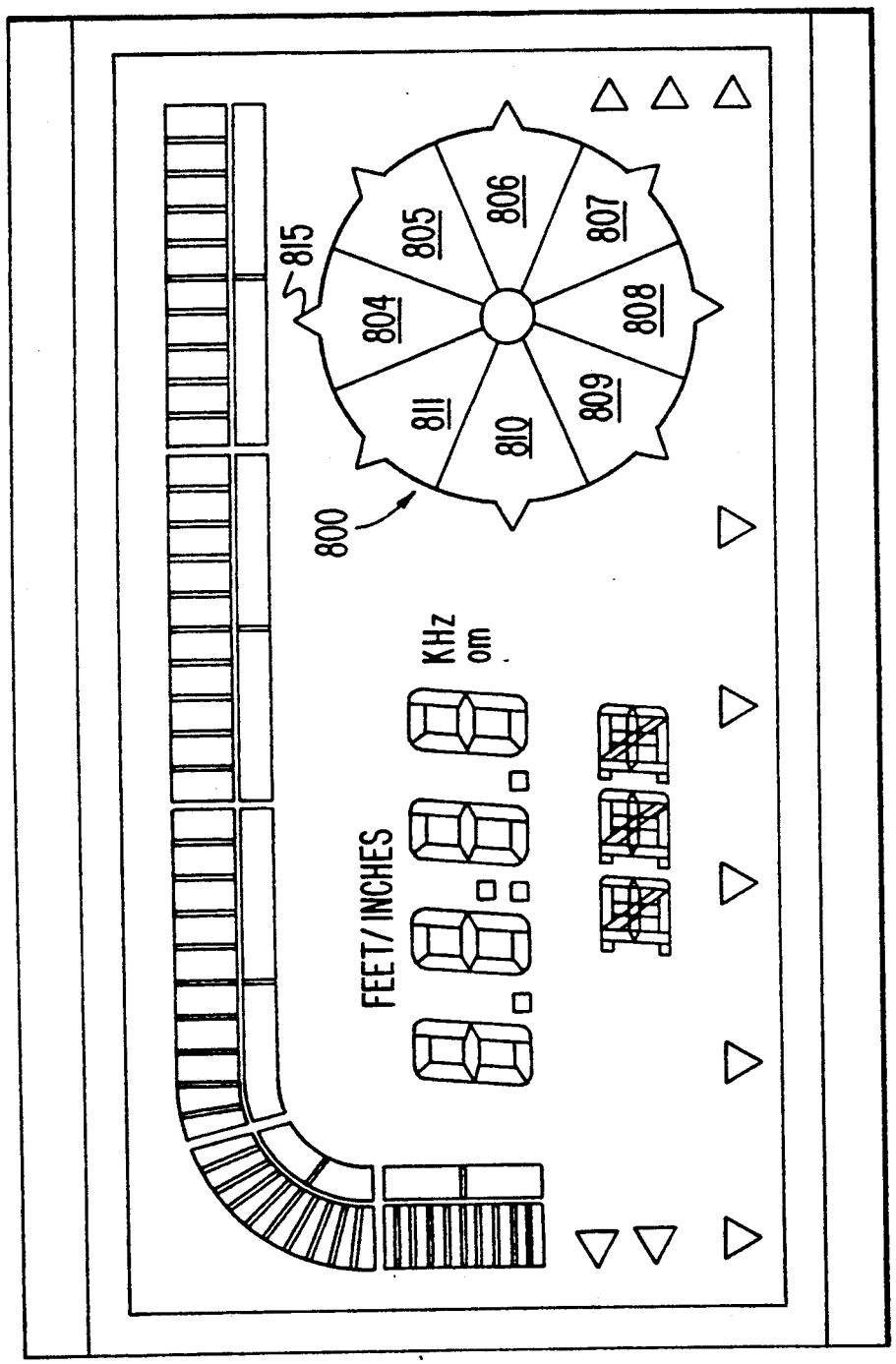
FIG. 9 illustrates an angle display for use with the angle sensor of FIG. 4.
Figure 10:
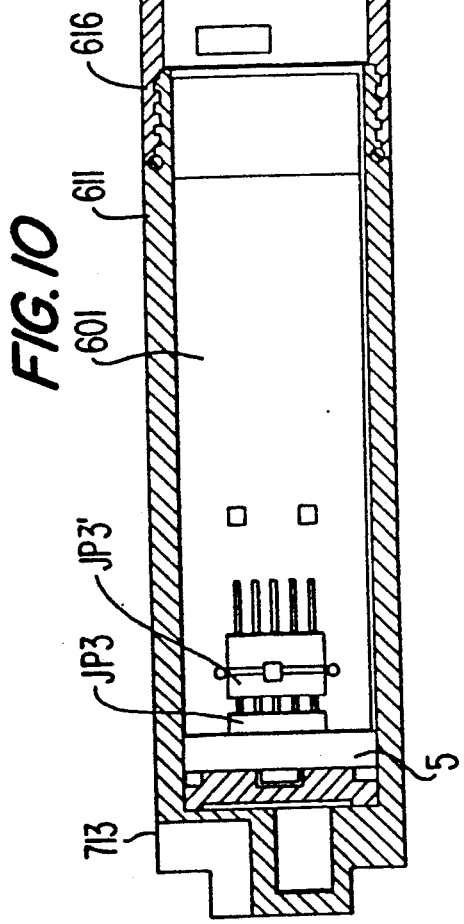
FIG. 10 is a top cross-sectional view of a transmitter housing having the angle sensor and the transmitter disposed therein.
Figure 11:
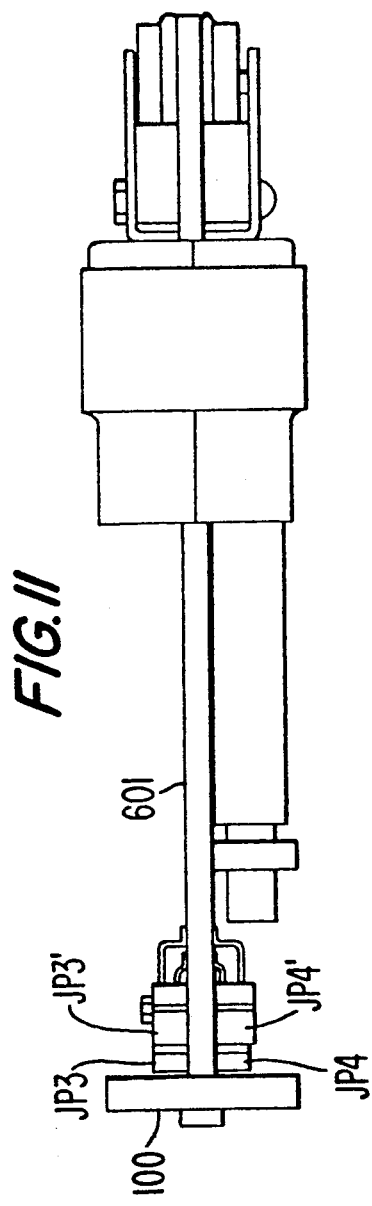
FIG. 11 is a side view of the transmitter and angle sensor of FIG. 10.

FIG. 9 illustrates an angle display of the receiver in accordance with one embodiment of the invention. Angle display 800 includes eight LCD segments 804–811. Each of the LCD segments 804–811 includes a pointer 815. The pointers are fixed at 0°, 45°, 90°, etc. Each of the LCD segments 804–811 represents an interval of 45°. Thus, display segment 804 indicates angles between −22.5° and +22.5°; display segment 805 between +22.5° and 67.5°, etc. Roll angles which correspond to one of the eight pointer angles are indicated by lighting the corresponding segment. Thus, to indicate an angle of 45°, segment 805 would be lit. The remaining eight intermediate angles are indicated by displaying the two adjacent principal angle segments. Thus, to indicate a roll angle of 22.5°, LCD segments 804 and 805 are illuminated.

It will be recognized that the above-described display is only one example of how the roll angle may be displayed and the invention is not limited in this respect. For example, a LCD digital readout of the roll angle may be provided. Additionally, a sixteen segment LCD may be utilized.

Preferably, an audible or visual indication such as a beep or an indicator light is provided whenever the receiver receives an angle signal from the beacon transmitter. The indication enables the operator to determine that the receiver is in fact continuing to receive angle data from the beacon.

The construction of a drilling assembly including the angle sensor of the present invention will be explained with reference to FIGS. 4 and 10–13. As shown in these Figures, connectors JP3 and JP4 of angle sensor 5 are coupled to connector JP3' and JP4' positioned at one end of PCB 601 of transmitter 600. PCB 601 and angle sensor 100 coupled thereto are positioned inside a two piece transmitter housing 611. The pieces of the transmitter housing are coupled to each other by the use of mating threads 616.

FIGS. 12 and 13 illustrate a drill bit particularly adapted for percussive boring. Drill bit 700 includes a body portion 705 which has a forward end portion 706 and a rearward end portion 707. Reference should be made to the above-identified U.S. Pat. No. 4,907,658 for the details of operatively coupling a drill bit to a mole body and an anvil to permit directional percussive boring. Bit 700 includes an angled cutting face 720. Transmitter housing 611 containing the PCB 601 and angle sensor 100 is positioned within internal opening 701 bit 700 before installation onto a suitably threaded percussion mole such as in U.S. Pat. No. 4,907,658. The transmitter housing must be positioned within internal opening 701 such that the electrical components or sensing elements have a predetermined relationship to the angled cutting face 720. PCB 601 includes two edge mouldings (not shown) about one inch long and centered on the edges of PCB 601. The mouldings engage slots in the transmitter housing 611 to insure that the angle sensor is fixed so as to have a predetermined relationship with outer slotted notch 713 in the housing 611. Slotted notch 713 engages a screw 725 which is inserted via opening 725 of steel bit 700 to rotationally fix all the tool components with respect to the steering feature of the boring tool. Other techniques may be utilized to provide this fixed relationship and the invention is not limited to the technique discussed above.

As illustrated in FIG. 20, a second sensor 100a may be positioned in the drill bit to provide an indication of the pitch of the drill blade relative to the horizontal. Pitch of the drill bit can be thought of as rotation of the bit within a vertical plane. The rotation is an arc (partial revolution) of radius which must not violate the allowable bend radius of the drill string. Otherwise, damage to elements of the drill string may occur. This information is particularly useful when the drill is being deflected upward or downward by obstacles such as rocks or tree roots. Knowledge of pitch angle provides additional information on the orientation of the drill bit, i.e., whether it is level or inclined upward or downward. This knowledge, for example, gives advance warning that the bit has been deflected off course or that the bit is in fact, reacting to an up or down steering correction before the change can actually be detected by monitoring only the depth of the head.

The angle sensors may be arranged such that an angle of 90° is established between the axis of the sensors. The pitch angle of the bit or head can best be evaluated when the pitch sensor is approximately vertically oriented (such as within ±45°) when the rotational centerline of the drill bit (and transmitter 600) is approximately horizontal. It will be apparent that other means of implementation, are possible. It will be appreciated that it may not be necessary to provide a full 360° range for the pitch angle sensor. For example, a range of 180° may be implemented to define a range between up and down. In most cases, a range of 90° (±45° from level) will be sufficient. The pitch angle may be displayed to an operator in a manner similar to that of the roll angle.

As shown in FIG. 14, in practice, an operator 900 utilizes a receiver 905 to receive signals from a transmitter 910 positioned in an underground boring tool 915. As illustrated, the field lines 930 produced by the coils of the transmitter are bipolar and axial. Receiver 905 tracks the progress of transmitter 910 as it moves underground or underwater. The receiver has several operating modes, including an active tracking mode in which it is tuned to the frequency of the subsurface transmitter. In this mode, it can locate the boring tool, measure its depth, and display the roll angle or pitch angle. It may also be possible to transmit the angle information to a receiver remote from the location of the drill bit through the use of an appropriate transmitter/receiver system. A wire-based system inside the drill string could also be used to obtain angle information from the sensor. Although described in conjunction with a steerable underground boring device, it can be appreciated that the angle sensor embodiments could have utility in any number of applications.

The above-described angle sensor is compact, simple, and low in cost. This makes it especially well-suited for applications such as sensing tool face angle within a tracking transmitter in the steerable head of a horizontal earth-boring machine where very little space is available. Further, the stored charge angle sensor is very fast, i.e. readouts may be obtained in ten microseconds. While the above description discusses a sequential reading of the capacitors, the reading may be of two or more or all of the capacitors in parallel.

A second embodiment of the present invention utilizes a high dielectric constant fluid having a high resistance instead of the dielectric coating on the inner planar surface of the ceramic disc. The construction and associated transmitter of the angle sensor of the second embodiment is the same as that of the first embodiment. However, the separation between the inner planar surface of the ceramic disc and the inner planar surface of the cup-shaped member is preferably ten thousandths of an inch (0.010"). In the second embodiment, a permanent dielectric coating is not formed on the capacitive electrode plates, and a high dielectric constant, high resistance fluid is used in place of the conductive fluid. An example of such a fluid is a 3M ® experimental product L-10065. In this case, the fluid would form the dielectric material located between the capacitive electrode plates and the cup-shaped member used as the common electrode. The operation of this embodiment is the same as for the first embodiment and will not be repeated here.

Figure 15A:
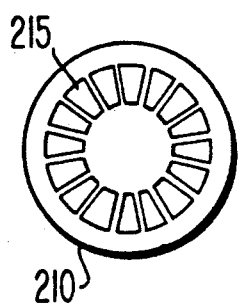
FIGS. 15(A and B) illustrates an angle sensor in accordance with another embodiment of the present invention.
Figure 15B:
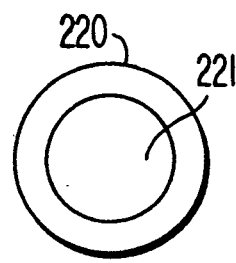

FIGS. 15 and 16 illustrate a third embodiment of the present invention. The sensor 200 includes sixteen identical electrodes 215 which are arranged in a circular array on PCB 210. Preferably PCB 210 is a circular disc which is approximately one inch in diameter, although it will be readily appreciated that the physical characteristics of the sensor will vary in accordance with the apparatus in which the invention is implemented. A disc 220 is spaced from PCB 210 and secured thereto by crimping a crimp seal 223 around the outer peripheral edges of disc 220 and the outer peripheral edges of PCB 210 as shown in FIG. 16. The resultant structure is sealed with a silicone greased elastomeric O-ring 170. The separation 165 between the inner planar surface of disc 220 and the inner planar surface of PCB 210 is approximately ten thousandths of an inch (0.010"). Disc 220 and PCB 210 define an interior space 240. Disc 220 includes an output electrode 221 positioned on an inner planar surface thereof as shown in FIG. 15(B). A non-conductive fluid 227 having a dielectric constant higher than air (such as K=10) is placed within internal space 240 such that the fluid covers approximately one-half of the number of electrodes. Again, as in the first embodiment, the number of electrodes covered is not critical. When the angle sensor is mounted in the drill bit and set on edge, non-conductive liquid 227 flows to the bottom of cavity 240 under the influence of gravity and lies between electrodes 215 and output electrode 221.

Figures 17A, 17B:
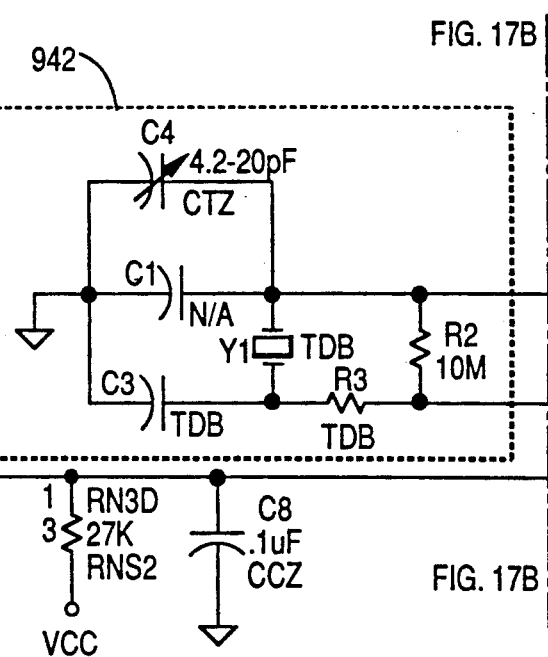
FIGS. 17(A-E) are a schematic diagram of a beacon transmitter for use with the angle sensor of FIG. 15.
Figure 17C:
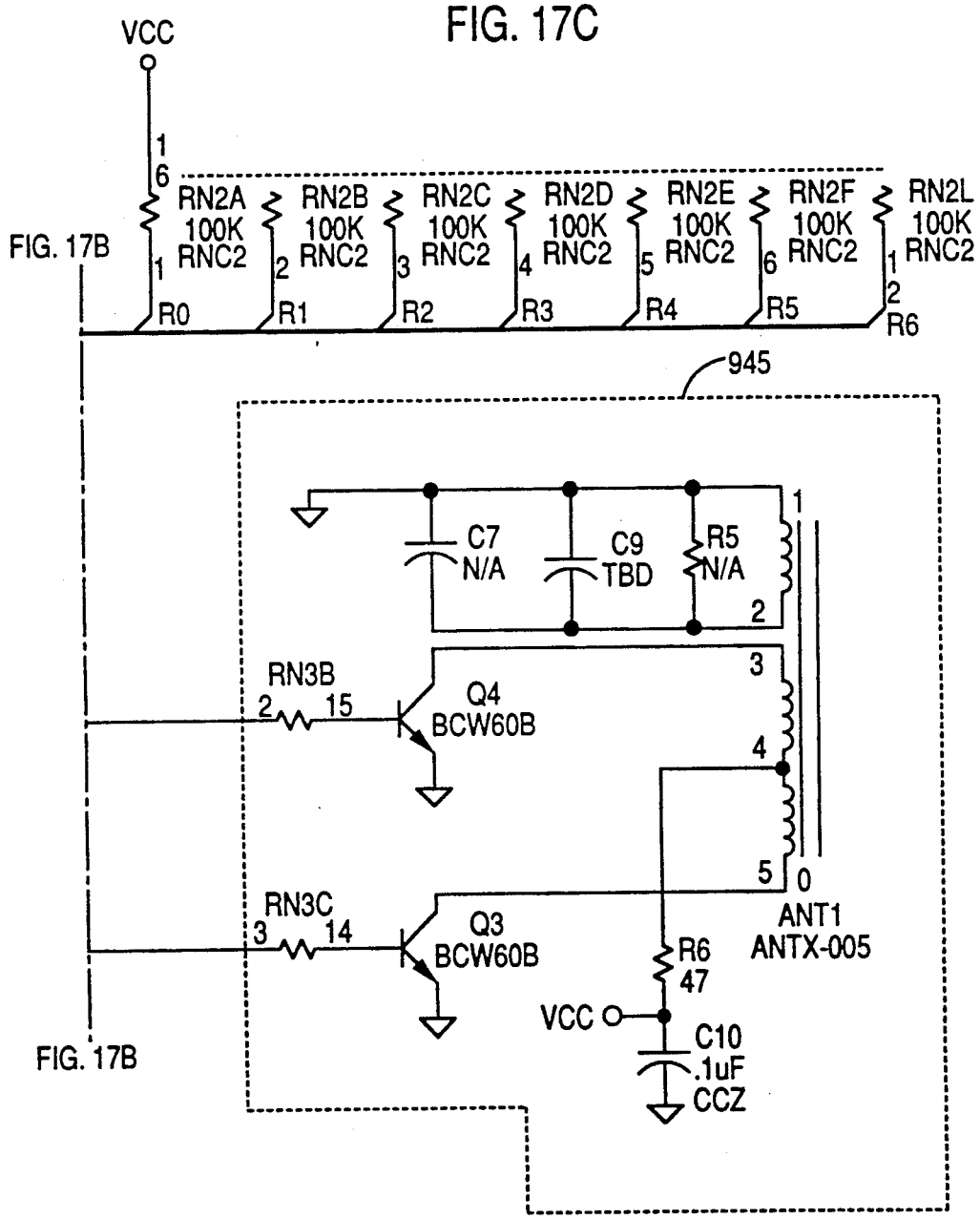
Figure 17D:
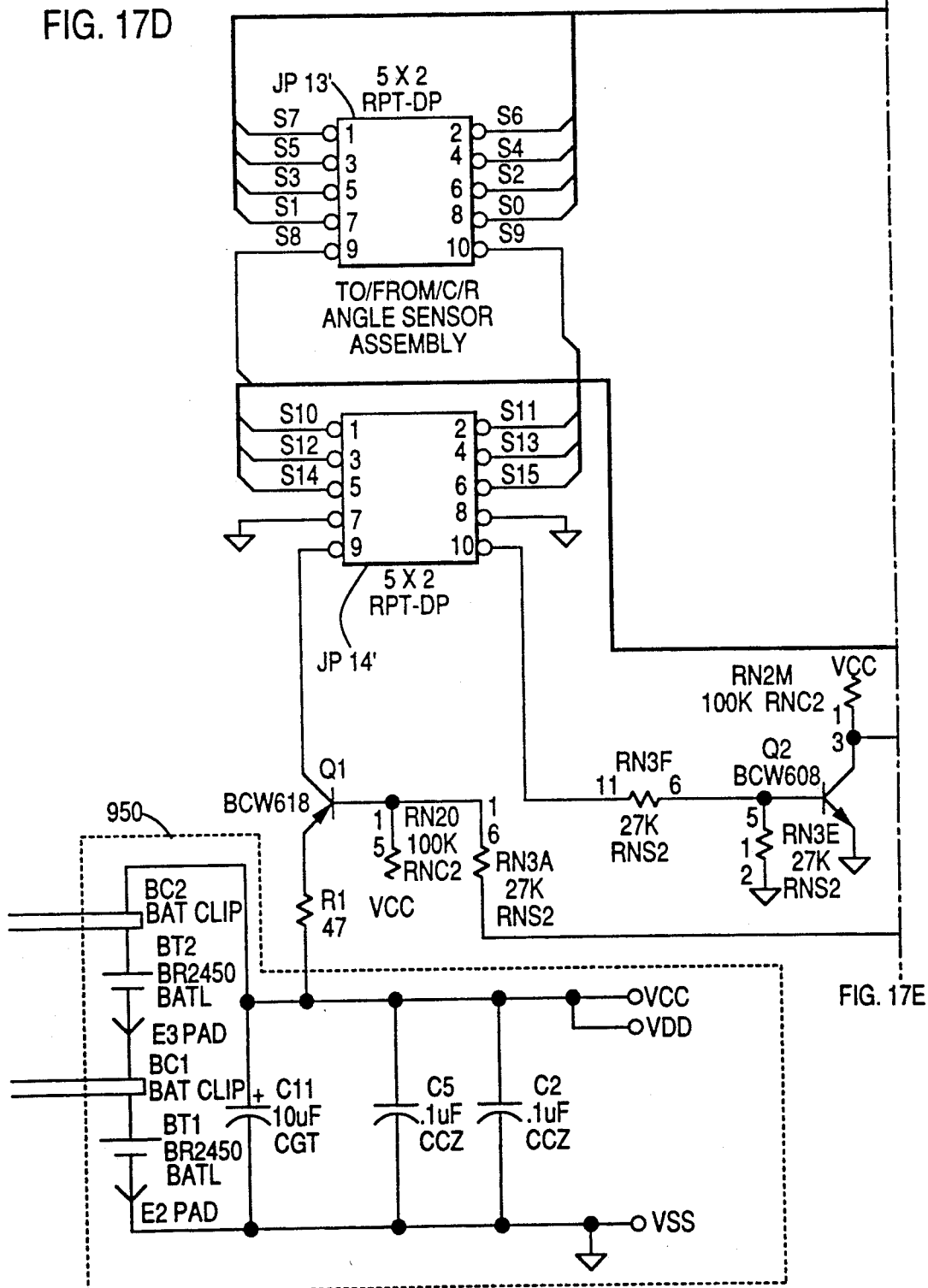

FIG. 17 illustrates a beacon transmitter 940 for use with angle sensor 200. Oscillation circuitry 942 including a crystal is coupled to inputs OSC1 and OCS2 of micro-controller U5 for timing and carrier generation purposes. The electromagnetic field signal and the angle information is output via PC2 and PC3 to an antenna through output section 945. Angle sensor 200 is interfaced to beacon transmitter 942 at JP13' and JP14'. Signal lines S0-S7 are respectively coupled to micro-controller input/output bits PA0-PA7 via connector JP3'. Signal lines S8 and S9 are respectively coupled to micro-controller input/output bits PB0 and PB1 via connector JP3'. Signal lines S10-S15 are respectively coupled to micro-controller input/output bits PB2-PB7 respectively. Power supply 950 supplies the power and the necessary operating voltages for the operation of the beacon transmitter 940. Micro-controller U5 controls the ON/OFF switching of transistor Q1 via output PC1 so as to control the application of power from power supply 950 to angle sensor 200. Input section 952 comprises a plurality of DIP switches which may be used to set selected inputs of micro-controller U15. The input DIP switches may be used, for example, to configure the transmitter to only generate the magnetic field signal, or to generate the magnetic field signal and transmit angle information or to perform the same functions as discussed with respect to transmitter 600.

Figure 18:
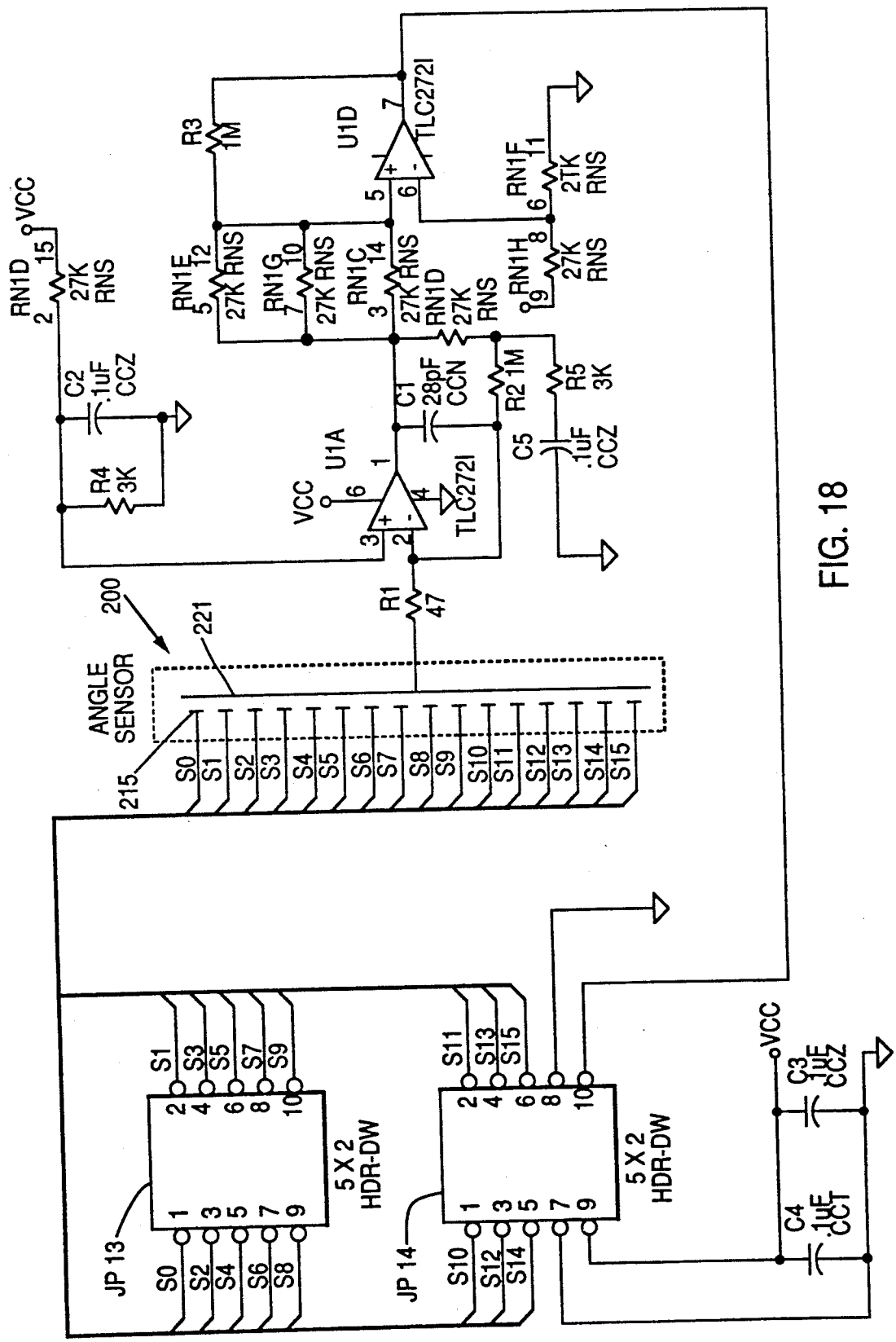
FIG. 18 is a schematic diagram of the angle sensor of FIG. 15.

FIG. 18 is a schematic diagram of angle sensor 200. As illustrated, electrodes 215 and output electrode 221 constitute sixteen capacitors. Micro-processor U5 of FIG. 18 sequentially pulses each of the sixteen capacitors one at a time by sequentially setting one bit high in port A (PA0-PA7) and port B (PB0-PB7). Output electrode 221 is coupled to the inverting input U1-2 of operational amplifier (op-amp) U1-A through a resistor R1 which functions to suppress high frequency transients. The inverting input U1-2 of amplifier U1-A is at a virtual ground. Amplifier output U1-1 thus goes negative to maintain U1-2 at a virtual ground potential.

If, for example, non-conductive fluid 227 in internal space 240 has a dielectric constant of ten, the amount of charge transferred when non-conductive fluid 227 is disposed between the capacitor plates will be ten times as great as when there is only air between the plates. The output voltage pulse at pin U1-1 will therefore also be ten times as great. Op-amp U1-B is coupled as a Schmitt trigger, and the remaining circuit components are selected so that output U1-7 goes negative only when the liquid is disposed between the capacitor plates. This output signal goes to transmitter 940 via connector JP14 where it is inverted by transistor Q2 and is supplied to the inputs TCAP and PD7 of micro-controller U5. Micro-controller U5 may be programmed so that a transition of input TCAP generates an interrupt signal, and input PD7 can be examined by micro-controller U5 to determine the high/low state of the sensor output at any time. As will be appreciated by the artisan, since the positions of drive plates 220 have a predetermined relationship to the angular orientation of the boring tool, the determination of the electrodes immersed in non-conductive fluid 227 by a high input signal to PD7 permits the roll angle to be determined in a manner similar to that discussed above with reference to the first embodiment.

The capacitances of each of the sixteen individual capacitors of capacitive angle sensor 200 are very small because of the small physical dimensions of the angle sensor. Thus, the stray circuit capacitance to ground may be larger. Furthermore, the combined capacitances of the fifteen "OFF" capacitors, which are being held near ground, exceed the capacitance of the single "ON" capacitor. Placing the input node of amplifier U1-A at virtual ground prevents these additional capacitances from shunting the signal and enables construction of a practical circuit.

A fourth embodiment of the present invention is an angle sensor utilizing a resistive liquid to determine a roll angle of a boring tool. The structure and circuitry associated with the resistive liquid angle sensor is the same as that for the angle sensor 200 of the third embodiment. The resistive angle sensor includes a circular PCB with a diameter of approximately one inch. Sixteen electrodes are arranged in a circular array on the PCB. The positions of the electrodes have a predetermined relationship to the angular orientation of the boring tool. A disc having an annular output plate or electrode positioned on an inner planar surface thereof is secured to the PCB using a crimp seal. The separation between the inner planar surface of the PCB and the inner planar surface of the disc is approximately ten thousandths of an inch. A resistive liquid having a resistivity substantially lower than the resistivity of air is placed within the internal space defined by the PCB and the disc. When the sensor is mounted in the drill bit and set on edge, the resistive fluid flows to the bottom of the cavity under the influence of gravity and lies between the electrodes and the output electrode.

The operation of the resistive angle sensor is the same as for the capacitive angle sensor of FIG. 18. A micro-controller sequentially pulses each of the sixteen sets of electrical elements by sequentially setting one bit at a time high in port A or port B. The common output electrode is coupled to the inverting input U1-2 of operational amplifier U1-A through resistor R1 which functions to suppress high frequency transients. The inverting input U1-2 of amplifier U1-A is a virtual ground, so when the electrodes are immersed in the resistive fluid, the positive pulse causes current to flow out of the amplifier input, and the amplifier output U1-1 thus goes negative to maintain U1-2 at ground potential.

Operational amplifier U1-B is coupled as a Schmitt trigger, and the circuit components are selected so that output U1-7 goes negative only when the electrodes are immersed in the fluid. This output signal goes to the transmitter circuit board where it is inverted by transistor Q2 and goes to the inputs TCAP and PD7 of microprocessor U1. Microprocessor U1 may be programmed so that a transition of input TCAP generates an interrupt signal, and input PD7 can be examined by the microprocessor to determine the state of the sensor output at any time. Since the positions of electrodes have a predetermined relationship to the angular orientation of the boring tool, the determination of the electrodes immersed in the resistive fluid permits the roll angle to be determined as discussed above with reference to the first embodiment.

A fifth embodiment of the present invention is an angle sensor utilizing a conductive fluid to determine a roll angle of a boring tool. The structure and processing associated with the conductive angle sensor is similar to that for the capacitive and resistive angle sensors and will not be illustrated here. The conductive angle sensor includes a circular ceramic disc with a diameter of approximately one inch. Sixteen metal electrodes are arranged in a circular array on the ceramic disc. The position of the electrodes have a predetermined relationship to the angular orientation of the boring tool. A coating of Teflon covers the inner surface of the ceramic disc, with a hole in the Teflon coating formed over each of the electrodes. A metal cup-shaped member having a common annular electrode positioned on an inner planar surface thereof is crimped around the outer planar surface of ceramic disc. The separation between the electrodes on the ceramic disc and the common plate is approximately ten thousandths of an inch. The inner planar surface of cup-shaped member is also covered with a coating of Teflon and further includes sixteen holes formed opposite the respective electrodes on the inner surface of the ceramic disc. A conductive liquid such as mercury is placed within the internal space defined by the ceramic disc and the cup-shaped member. When the sensor is mounted in the drill bit and set on edge, the conductive liquid flows to the bottom of the internal space under the influence of gravity and forms an electrical contact between the electrodes on the ceramic disc and the common plate. The Teflon coating prevents bridging of the electrodes by droplets of the liquid.

The determination of which electrodes have the conductive liquid between it and the common plate is the same as for the resistive capacitive angle sensors and will not be repeated here.

Other fluids may be disposed in the cavity and the invention is not limited to the embodiments described above. For example, a dielectric coating may be placed on the inner planar surfaces of the disc and PCB and a resistive or conductive fluid may be used.

Figure 19A:
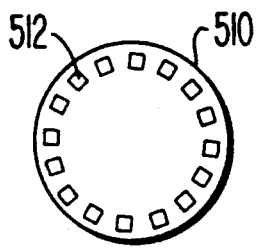
FIGS. 19(A and B) illustrates an angle sensor in accordance with another embodiment of the present invention.
Figure 19B:
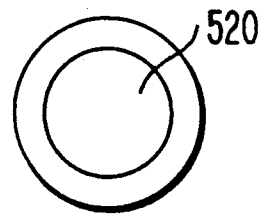

With reference to FIG. 19, a sixth embodiment of a roll sensor of the present invention includes printed circuit board (PCB) 510 having sixteen light emitting diode (LED) chips 512. LED chips 512 are surface mounted in a circular arrangement on PCB 510 as shown in FIG. 19(A). FIG. 19(B) illustrates a collimating lens 520 which is positioned opposite LED chips 512 with a predetermined gap of approximately 50 to 60 thousandths of an inch therebetween. Collimating lens 520 is arranged to collect and focus light from LED chips 512. PCB 510 and collimating lens 520 are arranged as discussed above with respect to the other angle sensors. A drop of an opaque liquid which is large enough to block the light emitted by at least one of LED chips 512 at all times is placed within the angle sensor. Preferably, the drop of opaque liquid is large enough to block the light emitted by a single LED chip 15. The opaque liquid may be ethylene glycol mixed with an opaque organic dye, although the invention is not limited in this respect and other opaque liquids may be used. A photodetector (not shown) is mounted at focal point F of collimating lens 520.

A microprocessor may sequentially pulse each of the LED chips and receive information output from the photodetector. Output ports of the microprocessor may output the position information.

LED chips 512 are sequentially pulsed until no light is detected by the photodetector. As discussed above the liquid drop always blocks the light emitted by one of the LED chips 15. By sequentially switching on each of the LED chips, the chip or chips whose light is blocked by the liquid drop may be determined. Since the positions of LED chips 512 have a predetermined relationship to the angular orientation of the boring tool, the determination of the LED chips whose light is blocked by the liquid drop permits the roll angle to be determined.

After the first determination of the direction of acceleration or roll angle, the micro-controller initiates subsequent measurements by first switching on the LED chip from which no light was detected in the previous measurement. If this LED is still blocked by the drop of liquid, no further action is needed. If, however, light is received by the photodetector when this LED is switched on, the micro-controller then respectively switches on the LEDs on each side of the previously blocked LED. Only if light is received by the photodetector from the LED chips on each side of the previously blocked LED chip is a full sequential scan made of all the LED chips.

In a variation of this embodiment, PCB includes sixteen photodetectors respectively mounted opposite the LEDs on an inner planar surface thereof.

Circuitry may sequentially pulse each of the LED chips and receive the information output by the photodetector opposite the pulsed LED. A microprocessor may control the sequential pulsing of the LEDs and receive and process the information from the photodetectors. Output ports of the microprocessor output position information.

While the above-described embodiments have utilized planar arrays of sensing elements, the present invention is not limited in this respect. A non-planar array of sensing elements arranged in a predetermined manner for example on the inner surface of a sphere may be utilized for determining the orientation of a member in various planes.

Variations of the above-described principles will be apparent to those skilled in the art. For example, a solid object responsive to the rotation of the sensor may be used to in certain implementations rather than a fluid or liquid. An acoustic arrangement may also be devised which detects the presence or absence of a fluid relative to an array of acoustic sensing elements. Further, the invention may broadly be utilized to measure the orientation of a member in a plane and is not limited merely to rotatable members.

The invention has been described in detail in connection with the preferred embodiments. These embodiments, however, are merely for example only and the invention is not limited thereto. It will be apparent to those skilled in the art that other variations and modifications can easily be made within the scope of this invention as defined by the appended claims.

I claim:

1. A sensor for determining an orientation of a member, said sensor comprising:
a housing;
a plurality of capacitors formed by electrodes arranged on opposed first and second walls of said housing to have a predetermined relationship to the orientation of said member;
a fluid contained in said housing, said fluid present between electrodes of at least one capacitor and absent between electrodes of at least one other capacitor at orientations of said member;
addressing means for individually addressing said capacitors in sequence;
detecting means for detecting a presence or absence of fluid between the electrodes of each addressed capacitor and setting respective flags in accordance with the detected presence or absence of fluid; and
determining means for determining the roll angle of said rotatable member in accordance with a sequence of said respective flags and the predetermined relationship of the capacitors to the orientation of said member.

2. The sensor according to claim 1 wherein said fluid comprises a non-conductive liquid.

3. The sensor according to claim 2 wherein said non-conductive liquid has a dielectric constant greater than the dielectric constant of air.

4. The sensor according to claim 1 wherein said fluid comprises a dielectric liquid.

5. The sensor according to claim 4 wherein said dielectric liquid has a dielectric constant greater than the dielectric constant of air.

6. The sensor according to claim 1 wherein said fluid comprises a conductive liquid.

7. The sensor according to claim 6 wherein said conductive liquid has a conductivity greater than the conductivity of air.

8. The sensor according to claim 1 wherein said fluid comprises a resistive liquid.

9. The sensor according to claim 8 wherein said resistive liquid has a resistivity greater than the resistivity of air.

10. The roll angle sensor according to claim 1 wherein said addressing means comprises:
charging means for initially charging an addressed capacitor; and
discharging means for discharging said charged capacitor.

11. The roll angle sensor according to claim 10 wherein said detecting means comprises:
comparing means for comparing the charge on said discharging capacitor after a predetermined time period to a predetermined value; and
means for setting a flag if the charge on said discharging capacitor is greater than the predetermined value due the presence of fluid between the electrodes thereof.

12. The roll angle sensor according to claim 1 wherein said addressing means comprises:
discharging means for initially discharging an addressed capacitor; and
charging means for charging said discharged capacitor.

13. The roll angle sensor according to claim 12 wherein said detecting means comprises:
comparing means for comparing the charge on said charging capacitor after a predetermined time period to a predetermined value; and means for setting a flag if the charge on said charging capacitor is less than the predetermined value due the presence of fluid between the electrodes thereof.

14. The roll angle sensor according to claim 1 wherein said addressing means comprises:
means for applying a high level signal to an addressed capacitor.

15. The roll angle sensor according to claim 14 wherein said detecting means comprises:
circuit means for setting a flag when the charge transferred by said addressed capacitor is greater than a predetermined value.

16. The roll angle sensor according to claim 1 comprising sixteen capacitors.

17. The roll angle sensor according to claim 1 wherein said capacitors are defined by a circular array of electrodes on said first wall and a common electrode on said second wall.

18. The roll angle sensor according to claim 17 wherein said circular array of electrodes comprises sixteen electrodes.

19. The roll angle sensor according to claim 1 wherein said fluid comprises a conductive liquid selected from the group consisting of salt water, ethyl glycol, mercury, cupric nitrate, and methyl alcohol.

20. The sensor according to claim 1, wherein said housing is defined by a planar member and an electrically grounded cup-shaped member whose peripheral edges are crimped over an outer edge of said planar member
and said plurality of capacitors is defined by a circular array of electrodes on an inner surface of said planar member and a common electrode formed by said cup-shaped member.

21. An underground boring tool comprising:
a drill bit including a blade portion;
a sensor for determining an orientation of said drill bit, said sensor comprising:
  a housing;
  a plurality of capacitors formed by electrodes arranged on opposed first and second walls of said housing to have a predetermined relationship to the orientation of said drill bit;
  a fluid contained in said housing and disposed between electrodes of at least one capacitor;
  addressing means for individually addressing each of said capacitors in sequence;
  detecting means for detecting a presence or absence of fluid between the electrodes of each addressed capacitor and setting respective flags in accordance with the detected presence or absence of fluid; and
  determining means for determining the orientation of said drill bit in accordance with a sequence of said respective flags and the predetermined relationship of the capacitors to the orientation of said drill bit; and
a transmitter for transmitting a signal including the orientation of said drill bit.

22. The underground boring tool according to claim 21 wherein said fluid comprises a dielectric liquid.

23. The underground boring tool according to claim 22 wherein said dielectric liquid has a dielectric constant greater than the dielectric constant of air.

24. The underground boring tool according to claim 21 wherein said fluid comprises a conductive liquid.

25. The underground boring tool according to claim 24 wherein said conductive liquid has a conductivity greater than the conductivity of air.

26. The underground boring tool according to claim 21 wherein said fluid comprises a resistive liquid.

27. The underground boring tool according to claim 26 wherein said resistive liquid has a resistivity greater than the resistivity of air.

28. The underground boring tool according to claim 21 wherein one of said first and second walls includes a dielectric coating.

29. The underground boring tool according to claim 28 wherein the dielectric coating comprises at least one layer of barium titanate.

30. The underground boring tool according to claim 29 wherein said dielectric coating further comprises a layer of glass disposed over said at least one layer of barium titanate.

31. The underground boring tool according to claim 21 wherein said fluid comprises methyl alcohol.

32. The underground boring tool according to claim 21 wherein said sensor comprises a roll angle sensor for determining a roll angle of said drill bit about a roll axis.

33. The underground boring tool according to claim 32 wherein said opposed first and second walls comprise opposed first and second planar walls which are substantially perpendicular to the roll axis.

34. The underground boring tool according to claim 21 wherein said sensor comprises a pitch sensor for determining a pitch of said drill bit about a horizontal axis.

35. The underground boring tool according to claim 34 wherein said opposed first and second walls comprise opposed first and second spaced planar surfaces which are substantially perpendicular to the horizontal axis.

36. The underground boring tool according to claim 35 wherein said pitch sensor determines a pitch within a range of ±45° about the horizontal axis.

37. The underground boring tool according to claim 21 wherein said addressing means comprises:
charging means for initially charging an addressed capacitor; and
discharging means for discharging said charged capacitor.

38. The underground boring tool according to claim 37 wherein said detecting means comprises:
comparing means for comparing the charge on said discharging capacitor after a predetermined time period to a predetermined value; and
means for setting a flag if the charge on said discharging capacitor is greater than the predetermined value due the presence of fluid between the electrodes thereof.

39. The underground boring tool according to claim 21 wherein said addressing means comprises:
discharging means for initially discharging an addressed capacitor; and
charging means for charging said discharged capacitor.

40. The underground boring tool according to claim 39 wherein said detecting means comprises:
comparing means for comparing the charge on said charging capacitor after a predetermined time period to a predetermined value; and
means for setting a flag if the charge on said charging capacitor is less than the predetermined value due the presence of fluid between the electrodes thereof.

41. A method of determining an orientation of a member, the method comprising the steps of:
- arranging an array of electrodes on opposed first and second walls of a housing to form a plurality of capacitors having a predetermined relationship to the orientation of said member;
- partially filling said housing with fluid which is disposed between at least one capacitor having one electrode on said first wall and one electrode on said second wall;
- individually addressing each of said capacitors in sequence;
- detecting the presence or absence of fluid between each addressed capacitor;
- setting respective flags in accordance with the detected presence or absence of fluid; and
- determining the orientation of said member in accordance with a sequence of said respective flags and the predetermined relationship of the electrodes to the orientation of said member.

42. A sensing device for determining an orientation of a member, said sensing device comprising at least two sensors, each sensor including a housing, a plurality of capacitors formed by electrodes arranged on opposed first and second walls of said housing to have a predetermined relationship to the orientation of said member, a fluid contained in said housing and disposed at least between electrodes of at least one capacitor, addressing means for individually addressing each of said capacitors in sequence, detecting means for detecting a presence or absence of fluid between the electrodes of each addressed capacitor and setting respective flags in accordance with the detected presence or absence of fluid, and determining means for determining the orientation of said member in accordance with a sequence of said respective flags and the predetermined relationship of said electrodes to the orientation of said member.

* * * * *